(12) United States Patent
Montero et al.

(10) Patent No.: US 10,789,609 B2
(45) Date of Patent: Sep. 29, 2020

(54) SYSTEMS AND METHODS FOR AUTOMATED PROMOTION TO PROFILE MATCHING

(71) Applicant: Eversight, Inc., Palo Alto, CA (US)

(72) Inventors: Michael Montero, Palo Alto, CA (US); David Moran, Palo Alto, CA (US)

(73) Assignee: Eversight, Inc., Palo Alto, CA (US)

( * ) Notice: Subject to any disclaimer, the term of this patent is extended or adjusted under 35 U.S.C. 154(b) by 394 days.

(21) Appl. No.: 15/345,395

(22) Filed: Nov. 7, 2016

(65) Prior Publication Data
US 2017/0148050 A1    May 25, 2017

Related U.S. Application Data

(63) Continuation-in-part of application No. 14/209,851, filed on Mar. 13, 2014, now Pat. No. 9,984,387.

(60) Provisional application No. 61/780,630, filed on Mar. 13, 2013.

(51) Int. Cl.
*G06Q 30/00*  (2012.01)
*G06Q 30/02*  (2012.01)
*G06Q 10/06*  (2012.01)

(52) U.S. Cl.
CPC ....... *G06Q 30/0244* (2013.01); *G06Q 10/063* (2013.01); *G06Q 30/0269* (2013.01)

(58) Field of Classification Search
CPC . G06Q 30/0277; G06Q 30/0269; G06Q 30/02
See application file for complete search history.

(56) References Cited

U.S. PATENT DOCUMENTS

| | | | |
|---|---|---|---|
| 7,158,959 B1 | 1/2007 | Chickering et al. | |
| 7,376,603 B1 | 5/2008 | Mayr et al. | |
| 7,639,727 B1 | 12/2009 | Brisebois et al. | |
| 7,908,159 B1 * | 3/2011 | Ordonez | G06Q 30/02 705/7.33 |

(Continued)

OTHER PUBLICATIONS

Cui; Constrained Optimization with Generic Algorithm; 2010 IEEE; pp. 26-30; 2010.*

(Continued)

*Primary Examiner* — Radu Andrei
(74) *Attorney, Agent, or Firm* — Kang S. Lim

(57) ABSTRACT

Systems and methods for automated profile to promotion matching are provided. A plurality of segment variable value pairs that define a plurality of possible segments for a population of consumers are first identified, as are a plurality of promotion variable value pairs of a promotional design space. The variable value pairs are assembled into a plurality of test promotions by different permutations. The test promotions are administered, and results are collected. Trends between specific segment variable value pairs and promotion variable value pairs that result in statistically relevant shifts in the obtained responses are identified and used to define segments. The defined segments are then matched to promotion types (collected from a promotion repository) based upon likelihood of a positive result. The matches are then classified by a behavioral economic classification, which then may be outputted to a marketer to provide insights into consumer motivations.

18 Claims, 17 Drawing Sheets

(56) References Cited

U.S. PATENT DOCUMENTS

| | | | | |
|---|---|---|---|---|
| 8,359,286 B1* | 1/2013 | Nering | G06Q 10/04 706/46 |
| 8,606,626 B1* | 12/2013 | DeSoto | G06Q 30/00 709/204 |
| 8,732,101 B1* | 5/2014 | Wilson | G06N 3/063 706/15 |
| 8,920,243 B1* | 12/2014 | Curtis | A63F 13/61 463/42 |
| 2002/0087453 A1 | 7/2002 | Nicolaisen et al. |
| 2002/0156714 A1* | 10/2002 | Gatto | G06Q 40/04 705/36 R |
| 2002/0161641 A1 | 10/2002 | Quinlan et al. |
| 2003/0204437 A1 | 10/2003 | Flender et al. |
| 2004/0093542 A1 | 5/2004 | Isodono et al. |
| 2004/0123247 A1 | 6/2004 | Wachen et al. |
| 2004/0133457 A1 | 7/2004 | Sadiq et al. |
| 2004/0148211 A1 | 7/2004 | Honarvar et al. |
| 2004/0223648 A1 | 11/2004 | Hoene et al. |
| 2004/0243455 A1* | 12/2004 | Smith | G06Q 30/0601 705/26.1 |
| 2005/0096963 A1 | 5/2005 | Myr et al. |
| 2005/0171843 A1* | 8/2005 | Brazell | G06Q 30/02 705/14.13 |
| 2005/0189415 A1 | 9/2005 | Fano et al. |
| 2005/0246206 A1 | 11/2005 | Obora et al. |
| 2006/0167917 A1 | 7/2006 | Solomon |
| 2006/0259835 A1 | 11/2006 | Marinissen et al. |
| 2007/0288304 A1* | 12/2007 | Gutierrez | G06Q 30/0251 705/14.49 |
| 2008/0010130 A1* | 1/2008 | Pyhalammi | G06Q 30/0601 705/14.26 |
| 2008/0021909 A1 | 1/2008 | Black et al. |
| 2008/0033808 A1 | 2/2008 | Black et al. |
| 2008/0082399 A1* | 4/2008 | Noble | G06Q 30/0204 705/7.33 |
| 2008/0189156 A1 | 8/2008 | Voda et al. |
| 2009/0006156 A1* | 1/2009 | Hunt | G06Q 30/02 705/7.11 |
| 2009/0282343 A1 | 11/2009 | Catlin et al. |
| 2009/0292588 A1* | 11/2009 | Duzevik | G06N 3/126 705/7.29 |
| 2009/0292771 A1 | 11/2009 | Bertoni et al. |
| 2010/0153332 A1 | 6/2010 | Rollins et al. |
| 2010/0179875 A1* | 7/2010 | Naito | G06Q 30/0256 705/14.54 |
| 2010/0185496 A1* | 7/2010 | Hahn | G06Q 30/0204 705/7.33 |
| 2010/0274661 A1 | 10/2010 | Asltonen et al. |
| 2011/0045831 A1 | 2/2011 | Chiu et al. |
| 2011/0119155 A1 | 5/2011 | Hammad et al. |
| 2011/0161113 A1 | 6/2011 | Rumak et al. |
| 2011/0173055 A1 | 7/2011 | Ross et al. |
| 2011/0258049 A1 | 10/2011 | Ramer et al. |
| 2012/0158099 A1 | 6/2012 | Lee |
| 2012/0246010 A1* | 9/2012 | Foth | G06Q 30/02 705/14.66 |
| 2012/0310728 A1* | 12/2012 | Kagan | G06Q 30/02 705/14.43 |
| 2013/0073388 A1 | 3/2013 | Heath |
| 2013/0110880 A1 | 5/2013 | Farchi et al. |
| 2013/0138812 A1 | 5/2013 | Assuncao et al. |
| 2013/0346302 A1 | 12/2013 | Purves et al. |
| 2014/0046872 A1 | 2/2014 | Arnott et al. |
| 2014/0081741 A1 | 3/2014 | Katsur |
| 2014/0095611 A1 | 4/2014 | Weinstein et al. |
| 2014/0129371 A1* | 5/2014 | Wilson | G06Q 30/0631 705/26.7 |
| 2014/0278786 A1 | 9/2014 | Liu-Qiu-Yan |
| 2014/0278798 A1 | 9/2014 | Goyal et al. |
| 2014/0279196 A1* | 9/2014 | Wilson | G06Q 30/0631 705/26.7 |
| 2014/0324532 A1* | 10/2014 | Ghosh | G06Q 30/0202 705/7.31 |
| 2014/0337120 A1 | 11/2014 | Ercanbrack |
| 2015/0049924 A1 | 2/2015 | Tang et al. |
| 2015/0050970 A1 | 2/2015 | Racho |
| 2015/0117631 A1 | 4/2015 | Tuchman et al. |
| 2015/0220835 A1* | 8/2015 | Wilson | G06Q 30/0282 706/46 |
| 2015/0220836 A1* | 8/2015 | Wilson | H04L 67/18 706/46 |
| 2016/0071162 A1* | 3/2016 | Ogawa | G06Q 30/0269 705/14.66 |
| 2016/0155193 A1 | 6/2016 | Merrill et al. |

OTHER PUBLICATIONS

Shao; Construction of Bayesian Classifier with GA for Response Modeling in Direct; 2009 IEEE; pp. 80-84; 2009.*

* cited by examiner

SYSTEMS AND METHODS FOR AUTOMATED PROMOTION TO PROFILE MATCHING

CROSS REFERENCE TO RELATED APPLICATION

This continuation-in-part application claims the benefit of U.S. application entitled "Architecture and Methods for Promotion Optimization," U.S. application Ser. No. 14/209,851, filed in the USPTO on Mar. 13, 2014, by inventor Moran, which claims priority under 35 U.S.C. 119(e) to a commonly owned U.S. provisional patent application entitled "Architecture and Methods for Promotion Optimization," U.S. Application No. 61/780,630, filed in the USPTO on Mar. 13, 2013, by inventor Moran, all of which are incorporated herein by reference.

The present invention is related to the following applications, all of which are incorporated herein by reference:

Commonly owned U.S. application Ser. No. 14/231,426, filed on Mar. 31, 2014, entitled "Adaptive Experimentation and Optimization in Automated Promotional Testing," by Moran et al.

Commonly owned U.S. application Ser. No. 14/231,432, filed on Mar. 31, 2014, entitled "Automated and Optimal Promotional Experimental Test Designs Incorporating Constraints," by Moran et al.

Commonly owned U.S. application Ser. No. 14/231,440, filed on Mar. 31, 2014, entitled "Automatic Offer Generation Using Concept Generator Apparatus and Methods Therefor," by Moran et al.

Commonly owned U.S. application Ser. No. 14/231,442, filed on Mar. 31, 2014, entitled "Automated Event Correlation to Improve Promotional Testing," by Moran et al.

Commonly owned U.S. application Ser. No. 14/231,460, filed on Mar. 31, 2014, entitled "Automated Promotion Forecasting and Methods Therefor," by Moran et al.

Commonly owned U.S. application Ser. No. 14/231,555, filed on Mar. 31, 2014, entitled "Automated Behavioral Economics Patterns in Promotion Testing and Methods Therefor," by Moran et al.

BACKGROUND

The present invention relates generally to promotion optimization methods and enhanced population segment profiling in order to automate effective promotion to profile matching. More particularly, the present invention relates to computer-implemented methods and computer-implemented apparatus for the generation and administration of batches of promotions where population profile information is collected and trends in profiles' responses to specific promotion variables is identified. These associations may be coded, and utilized for downstream profile/promotion matching.

Promotion refers to various practices designed to increase sales of a particular product or services and/or the profit associated with such sales. Generally speaking, the public often associates promotion with the sale of consumer goods and services, including consumer packaged goods (e.g., food, home and personal care), consumer durables (e.g., consumer appliances, consumer electronics, automotive leasing), consumer services (e.g., retail financial services, health care, insurance, home repair, beauty and personal care), and travel and hospitality (e.g., hotels, airline flights, and restaurants). Promotion is particularly heavily involved in the sale of consumer packaged goods (i.e., consumer goods packaged for sale to an end consumer). However, promotion occurs in almost any industry that offers goods or services to a buyer (whether the buyer is an end consumer or an intermediate entity between the producer and the end consumer).

The term promotion may refer to, for example, providing discounts (using for example a physical or electronic coupon or code) designed to, for example, promote the sales volume of a particular product or service. One aspect of promotion may also refer to the bundling of goods or services to create a more desirable selling unit such that sales volume may be improved. Another aspect of promotion may also refer to the merchandising design (with respect to looks, weight, design, color, etc.) or displaying of a particular product with a view to increasing its sales volume. It includes calls to action or marketing claims used in-store, on marketing collaterals, or on the package to drive demand. Promotions may be composed of all or some of the following: price based claims, secondary displays or aisle end-caps in a retail store, shelf signage, temporary packaging, placement in a retailer circular/flyer/coupon book, a colored price tag, advertising claims, or other special incentives intended to drive consideration and purchase behavior. These examples are meant to be illustrative and not limiting.

In discussing various embodiments of the present invention, the sale of consumer packaged goods (hereinafter "CPG") is employed to facilitate discussion and ease of understanding. It should be kept in mind, however, that the promotion to profile matching methods and apparatuses discussed herein may apply to any industry in which promotion has been employed in the past or may be employed in the future.

Further, price discount is employed as an example to explain the promotions described herein. It should be understood, however, that promotions may be employed to manipulate factors other than price discount in order to influence the sales volume. An example of such other factors may include the call to action on a display or on the packaging, the size of the CPG item, the manner in which the item is displayed or promoted or advertised either in the store or in media, etc.

Generally speaking, it has been estimated that, on average, 17% of the revenue in the consumer packaged goods (CPG) industry is spent to fund various types of promotions, including discounts, designed to entice consumers to try and/or to purchase the packaged goods. In a typical example, the retailer (such as a grocery store) may offer a discount online or via a print circular to consumers. The discount may be broadly offered to the general public. Examples of promotions offered to general public include for example, a printed or electronic redeemable discount (e.g., coupon or code) for a specific CPG item. Another promotion example may include, for example, general advertising of the reduced price of a CPG item in a particular geographic area. Another promotion example may include in-store marking down of a particular CPG item only for a loyalty card user base.

The promotion may alternatively be specifically targeted to an individual consumer (based on, for example, that consumer's demographics or past buying behavior). This activity is well known and involves matching promotions to consumer profiles (also referred to as segments).

Historically, one of a number of methods have been utilized to identify consumer profile segments. These include 1) classification and regression trees (CART), decile and binding analysis and clustering analysis (e.g., k-means). Indeed, a number of "big data" organizations have been able to group people into very granular and discrete groups based upon a common behavior or interest. These existing organizations and systems, however, have difficulty translating these segments into actionable matches to specific promotions. For example, a company like Facebook collects data of a wealth of people, and offers the data for advertisers. An advertiser is able to select from a substantial list of potential customer segments, and may then advertise directly. The advertiser is left to their own historical experience to decide which consumer segments to advertise to.

As a result, we see many instances of "targeted ads", but not the significant improvement in sales from these ads as one would expect. This is because while these ads are targeted to a specific population, the content and format of the ad has not also been optimized for the population. Further, while the segments generated by the prior art may be mathematically sound, they are typically based on arbitrary attributes that do not translate well responsiveness to specific promotions (for example, Facebook provides access to a segment of consumers that 'like grass', which is difficult to relate to a specific promotional activity).

Because promotion is expensive (in terms of, for example, the effort to conduct a promotion campaign and/or the per-unit revenue loss to the retailer/manufacturer when the consumer decides to take advantage of the discount), efforts are continually made to minimize promotion cost while maximizing the return on promotion dollars investment. This effort is known in the industry as promotion optimization.

For example, a typical promotion optimization method may involve examining the sales volume of a particular CPG item over time (e.g., weeks). The sales volume may be represented by a demand curve as a function of time, for example. A demand curve lift (excess over baseline) or dip (below baseline) for a particular time period would be examined to understand why the sales volume for that CPG item increases or decreases during such time period.

FIG. 1 shows an example demand curve 102 for Brand X cookies over some period of time. Two lifts 110 and 114 and one dip 112 in demand curve 102 are shown in the example of FIG. 1. Lift 110 shows that the demand for Brand X cookies exceeds the baseline at least during week 2. By examining the promotion effort that was undertaken at that time (e.g., in the vicinity of weeks 1-4 or week 2) for Brand X cookies, marketers have in the past attempted to judge the effectiveness of the promotion effort on the sales volume. If the sales volume is deemed to have been caused by the promotion effort and delivers certain financial performance metrics, that promotion effort is deemed to have been successful and may be replicated in the future in an attempt to increase the sales volume. On the other hand, dip 112 is examined in an attempt to understand why the demand falls off during that time (e.g., weeks 3 and 4 in FIG. 1). If the decrease in demand was due to the promotion in week 2 (also known as consumer pantry loading or retailer forward-buying, depending on whether the sales volume shown reflects the sales to consumers or the sales to retailers), this decrease in weeks 3 and 4 should be counted against the effectiveness of week 2.

Another problem with the approach employed in the prior art has been the fact that the prior art approach is a backward-looking approach based on aggregate historical data. In other words, the prior art approach attempts to ascertain the nature and extent of the relationship between the promotion and the sales volume by examining aggregate data collected in the past. The use of historical data, while having some disadvantages (which are discussed later herein below), is not necessarily a problem. However, when such data is in the form of aggregate data (such as in simple terms of sales volume of Brand X cookies versus time for a particular store or geographic area), it is impossible to extract from such aggregate historical data all of the other factors that may more logically explain a particular lift or dip in the demand curve.

To elaborate, current promotion optimization approaches tend to evaluate sales lifts or dips as a function of four main factors: discount depth (e.g., how much was the discount on the CPG item), discount duration (e.g., how long did the promotion campaign last), timing (e.g., whether there was any special holidays or event or weather involved), and promotion type (e.g., whether the promotion was a price discount only, whether Brand X cookies were displayed/not displayed prominently, whether Brand X cookies were features/not featured in the promotion literature).

However, there may exist other factors that contribute to the sales lift or dip, and such factors are often not discoverable by examining, in a backward-looking manner, the historical aggregate sales volume data for Brand X cookies. This is because there is not enough information in the aggregate sales volume data to enable the extraction of information pertaining to unanticipated or seemingly unrelated events that may have happened during the sales lifts and dips and may have actually contributed to the sales lifts and dips.

Suppose, for example, that there was a discount promotion for Brand X cookies during the time when lift 110 in the demand curve 102 happens. However, during the same time, there was a breakdown in the distribution chain of Brand Y cookies, a competitor's cookies brand which many consumers view to be an equivalent substitute for Brand X cookies. With Brand Y cookies being in short supply in the store, many consumers bought Brand X instead for convenience sake. Aggregate historical sales volume data for Brand X cookies, when examined after the fact in isolation by Brand X marketing department thousands of miles away, would not uncover that fact. As a result, Brand X marketers may make the mistaken assumption that the costly promotion effort of Brand X cookies was solely responsible for the sales lift and should be continued, despite the fact that it was an unrelated event that contributed to most of the lift in the sales volume of Brand X cookies.

As another example, suppose, for example, that milk produced by a particular unrelated vendor was heavily promoted in the same grocery store or in a different grocery store nearby during the week that Brand X cookies experienced the sales lift 110. The milk may have been highlighted in the weekly circular, placed in a highly visible location in the store and/or a milk industry expert may have been present in the store to push buyers to purchase milk, for example. Many consumers ended up buying milk because of this effort whereas some of most of those consumers who bought during the milk promotion may have waited another week or so until they finished consuming the milk they bought in the previous weeks. Further, many of those milk-buying consumers during this period also purchased cookies out of an ingrained milk-and-cookies habit. Aggregate historical sales volume data for Brand X cookies would not uncover that fact unless the person analyzing the historical aggregate sales volume data for Brand X cookies happened to be present in the store during that week and had the insight to note that milk was heavily promoted that week and also the insight that increased milk buying may have an influence on the sales volume of Brand X cookies.

Software may try to take these unanticipated events into account but unless every SKU (stock keeping unit) in that store and in stores within commuting distance and all events, whether seemingly related or unrelated to the sales of Brand X cookies, are modeled, it is impossible to eliminate data noise from the backward-looking analysis based on aggregate historical sales data.

Even without the presence of unanticipated factors, a marketing person working for Brand X may be interested in knowing whether the relatively modest sales lift 114 comes from purchases made by regular Brand X cookies buyers or by new buyers being enticed by some aspect of the promotion campaign to buy Brand X cookies for the first time. If Brand X marketer can ascertain that most of the lift in sales during the promotion period that spans lift 114 comes from new consumers of Brand X cookies, such marketer may be willing to spend more money on the same type of sales promotion, even to the point of tolerating a negative ROI (return on investment) on his promotion dollars for this particular type of promotion since the recruitment of new buyers to a brand is deemed more much valuable to the company in the long run than the temporary increase in sales to existing Brand X buyers. Again, aggregate historical sales volume data for Brand X cookies, when examined in a backward-looking manner, would not provide such information.

Furthermore, even if all unrelated and related events and factors can be modeled, the fact that the approach is backward-looking means that there is no way to validate the hypothesis about the effect an event has on the sales volume since the event has already occurred in the past. With respect to the example involving the effect of milk promotion on Brand X cookies sales, there is no way to test the theory short of duplicating the milk shortage problem again. Even if the milk shortage problem could be duplicated again for testing purposes, other conditions have changed, including the fact that most consumers who bought milk during that period would not need to or be in a position to buy milk again in a long time. Some factors, such as weather, cannot be duplicated, making theory verification challenging.

Attempts have been made to employ non-aggregate sales data in promoting products. For example, some companies may employ a loyalty card program (such as the type commonly used in grocery stores or drug stores) to keep track of purchases by individual consumers. If an individual consumer has been buying sugar-free cereal, for example, the manufacturer of a new type of whole grain cereal may wish to offer a discount to that particular consumer to entice that consumer to try out the new whole grain cereal based on the theory that people who bought sugar-free cereal tend to be more health conscious and thus more likely to purchase whole grain cereal than the general cereal-consuming public. Such individualized discount may take the form of, for example, a redeemable discount such as a coupon or a discount code mailed or emailed to that individual. Again, this provides an example of promotion to profile matching that is based upon experience or assumptions rather than any empirically tested data.

Some companies may vary the approach by, for example, ascertaining the items purchased by the consumer at the point of sale terminal and offering a redeemable code on the purchase receipt. Irrespective of the approach taken, the utilization of non-aggregate sales data has typically resulted in individualized offers, and has not been processed or integrated in any meaningful sense into a promotion optimization effort to determine the most cost-efficient, highest-return manner to promote a particular CPG item.

Attempts have also been made to obtain from the consumers themselves indications of future buying behavior instead of relying on a backward-looking approach. For example, conjoint studies, one of the stated preference methods, have been attempted in which consumers are asked to state preferences. In an example conjoint study, a consumer may be approached at the store and asked a series of questions designed to uncover the consumer's future shopping behavior when presented with different promotions. Questions may be asked include, for example, "do you prefer Brand X or Brand Y" or "do you spend less than $100 or more than $100 weekly on grocery" or "do you prefer chocolate cookies or oatmeal cookies" or "do you prefer a 50-cent-off coupon or a 2-for-1 deal on cookies". The consumer may state his preference on each of the questions posed (thus making this study a conjoint study on stated preference).

However, such conjoint studies have proven to be an expensive way to obtain non-historical data. If the conjoint studies are presented via a computer, most users may ignore the questions and/or refuse to participate. If human field personnel are employed to talk to individual consumers to conduct the conjoint study, the cost of such studies tends to be quite high due to salary cost of the human field personnel and may make the extensive use of such conjoint studies impractical.

Further and importantly, it has been known that conjoint studies are somewhat unreliable in gauging actual purchasing behavior by consumers in the future. An individual may state out of guilt and the knowledge that he needs to lose weight that he will not purchase any cookies in the next six months, irrespective of discounts. In actuality, that individual may pick up a package of cookies every week if such package is carried in a certain small size that is less guilt-inducing and/or if the package of cookies is prominently displayed next to the milk refrigerator and/or if a 10% off discount coupon is available. If a promotion effort is based on such flawed stated preference data, discounts may be inefficiently deployed in the future, costing the manufacturer more money than necessary for the promotion.

Finally, none of the approaches track the long-term impact of a promotion's effect on brand equity for an individual's buying behavior over time. Some promotions, even if deemed a success by traditional short-term measures, could have damaging long-term consequences. Increased price-based discounting, for example, can lead to consumers increasing the weight of price in determining their purchase decisions, making consumers more deal-prone and reluctant to buy at full price, leading to less loyalty to brands and retail outlets.

Previous disclosures by the applicants have focused upon the ability to generate and administer a plurality of test promotions across consumer segments in a rapid manner in order to overcome the foregoing issues in a manner that results in cost-effective, high-return, and timely promotions to the general public. However, there are still remaining issues regarding how to best leverage the promotional testing in order to generate more useful consumer profiles, and subsequently how to match these profiles to future promotions in order to have a more effective promotional campaign. Previously, ad managers have often relied upon intuition and historical activity to generate the promotions presented to the user segments. Such systems, even when able to rapidly generate and deploy numerous advertising campaigns often result in missed opportunity and misalignments between the promotions being offered and the consumer segment being targeted since the segments are generated typically in a vacuum, and there is a lack of empirically driven means to match profiles to promotions advantageously.

It is therefore apparent that an urgent need exists for systems and methods for automated profile to promotion matching. Such systems and methods enable more effective promotions to be derived and offered to the correct consumer segments than has been traditionally possible.

SUMMARY

To achieve the foregoing and in accordance with the present invention, systems and methods for automated profile to promotion matching are provided.

In some embodiments, a plurality of segment variable value pairs that define a plurality of possible segments for a population of consumers are first identified, as are a plurality of promotion variable value pairs of a promotional design space. The variable value pairs are assembled into a plurality of test promotions by different permutations.

The test promotions are administered, and results are collected. Trends between specific segment variable value pairs and promotion variable value pairs that result in statistically relevant shifts in the obtained responses are identified and used to define segments. The defined segments are then matched to promotion types (collected from a promotion repository) based upon likelihood of a positive result. The matching includes generating a performance score model (y) that scores a combine feature set from promotions (Z) and profiles (J) based on performance using the equation: y=performance score=$Z\theta+J\delta+\epsilon$.

The matches are then classified by a behavioral economic classification, which then may be outputted to a marketer to provide insights into consumer motivations. In some embodiments, the behavioral economic classification is generated using a trained and curated set of behavioral economic principles assigned to a promotion to segment match to generate and train an association model. The behavioral economic classification (BEC) is described by a linear combination of features of the promotion (Z) and profile (J): y=BEC=$Z\mu+J\alpha+\epsilon$.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
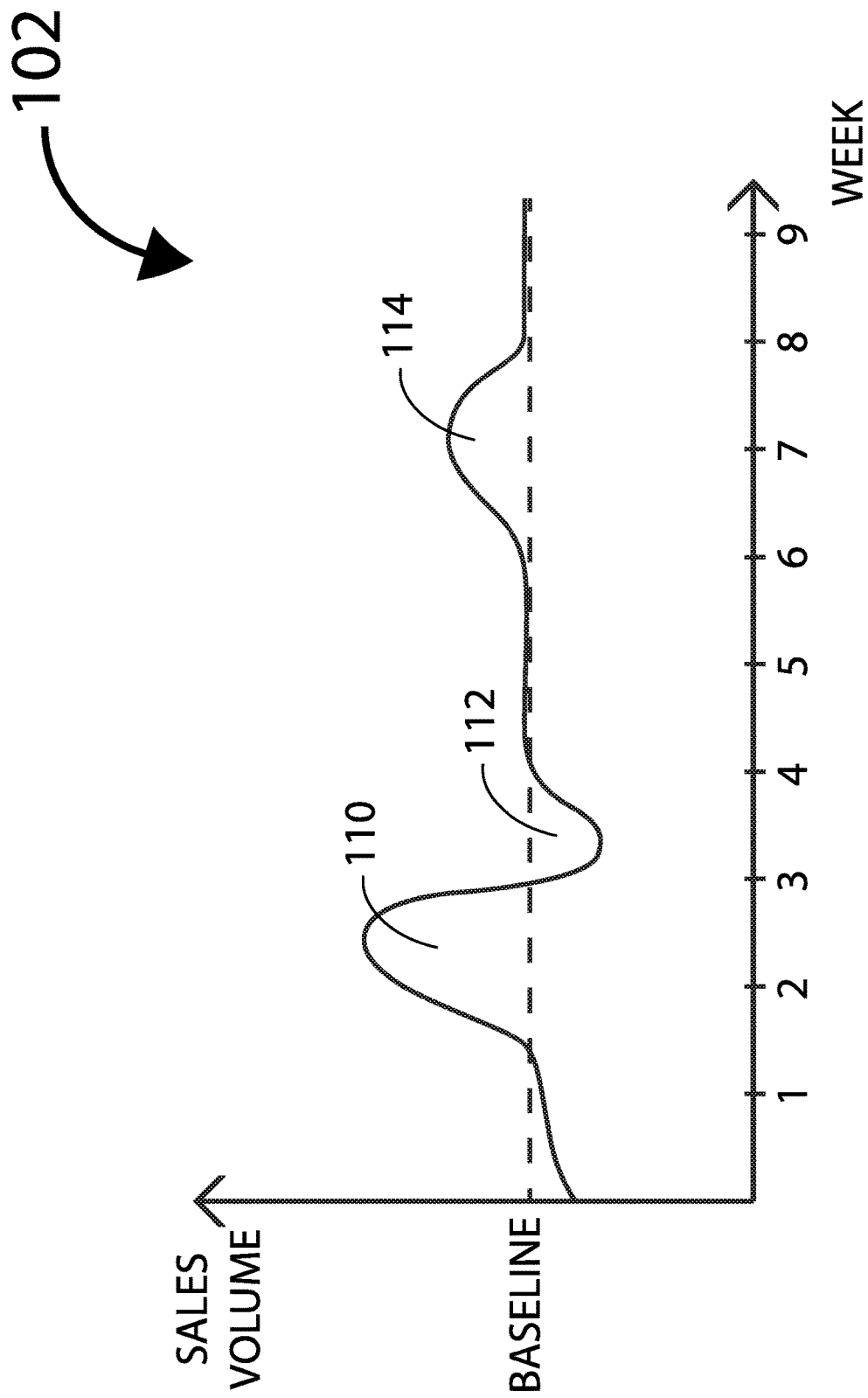
FIG. 1 shows an example demand curve 102 for Brand X cookies over some period of time.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after,"

"lastly," and "finally," are not meant to limit the scope of the present invention as the embodiments disclosed herein are merely exemplary.

The present invention relates to promotion experimentation in order to derive effective consumer segments. In this disclosure, the terms "segment" and "profile" are often utilized interchangeably to refer to a grouping of potential consumers by some attributes that may help predict their reaction to a particular promotional activity. Such systems particularly excel when coupled with systems for optimizing promotions by administering, in large numbers and iteratively, test promotions on purposefully segmented subpopulations in advance of a general segment wide promotion roll-out. In one or more embodiments, the inventive forward-looking promotion optimization (FL-PO) involves obtaining actual revealed preferences from individual consumers of the segmented subpopulations being tested. As such much of the following disclosure will focus upon mechanisms of forward looking promotional optimizations, in order to understand the context within which the profile to promotional matching is effective.

The following description of some embodiments will be provided in relation to numerous subsections. The use of subsections, with headings, is intended to provide greater clarity and structure to the present invention. In no way are the subsections intended to limit or constrain the disclosure contained therein. Thus, disclosures in any one section are intended to apply to all other sections, as is applicable.

I. Forward Looking Promotion Optimization

Within the forward-looking promotion optimization, the revealed preferences are obtained when the individual consumers respond to specifically designed actual test promotions. A complimentary benefit of this optimization is the ability to refine consumer profile segments, and generate statistical associations between the promotions and the segments that best respond to them. The revealed preferences are tracked in individual computer-implemented accounts (which may, for example, be implemented via a record in a centralized database and rendered accessible to the merchant or the consumer via a computer network such as the internet) associated with individual consumers, thereby enabling profile tracking and generation. For example, when a consumer responds, using his smart phone or web browser, to a test promotion that offers 20% off a particular consumer packaged goods (CPG) item, that response is tracked in his individual computer-implemented account. Such computer-implemented accounts may be implemented via, for example, a loyalty card program, apps on a smart phone, computerized records accessible via a browser, social media news feed, etc.

In one or more embodiments, a plurality of test promotions may be designed and tested on a plurality of groups of consumers (the groups of consumers are referred to herein as "subpopulations"). The responses by the consumers are recorded and analyzed, with the analysis result employed to generate additional test promotions or to formulate the segment wide promotions. In some cases the subpopulations are purposefully chosen at random. This is especially helpful when a general promotion is the end goal. However, for the purpose of automated promotion to profile matching, the system may instead select specific known segments for the subpopulations, and further refine these segments based upon statistical similarities identified during testing.

As will be discussed later herein, if the consumer actually redeems the offer, one type of response is recorded and noted in the computer-implemented account of that consumer. Even if an action by the consumer does not involve actually redeeming or actually taking advantage of the promotional offer right away, an action by that consumer may, however, constitute a response that indicates a level of interest or lack of interest and may still be useful in revealing the consumer preference (or lack thereof). For example, if a consumer saves an electronic coupon (offered as part of a test promotion) in his electronic coupon folder or forwards that coupon to a friend via an email or a social website, that action may indicate a certain level of interest and may be useful in determining the effectiveness of a given test promotion. Different types of responses by the consumers may be accorded different weights, in one or more embodiments. Within some settings, the primary feedback collected from the consumer is the rate the consumer decides to upload or otherwise save a promotion, and actual redemption rate.

As previously touched upon, the groups of consumers involved in promotion testing represent segments of the public that have been purposefully segmented in accordance with segmenting criteria specifically designed for the purpose of testing the test promotions. As the term is employed herein, a subpopulation is deemed purposefully segmented when its members are selected based on criteria other than merely to make up a given number of members in the subpopulation. Demographics, buying behavior, behavioral economics are example criteria that may be employed to purposefully segment a population into subpopulations for promotion testing. In an example, a segmented population may number in the tens or hundreds or even thousands of individuals. In contrast, the general public may involve tens of thousands, hundreds of thousands, or millions of potential customers.

By purposefully segmenting the public into small subpopulations for promotion testing, embodiments of the invention can exert control over variables such as demographics (e.g., age, income, sex, marriage status, address, etc.), buying behavior (e.g., regular purchaser of Brand X cookies, consumer of premium food, frequent traveler, etc.), weather, shopping habits, life style, and/or any other criteria suitable for use in creating the subpopulations. More importantly, the subpopulations are kept small such that multiple test promotions may be executed on different subpopulations, either simultaneously or at different times, without undue cost or delay in order to obtain data pertaining to the test promotion response behavior. The low cost/low delay aspect of creating and executing test promotions on purposefully segmented subpopulations permits, for example, what-if testing, testing in statistically significant numbers of tests, and/or iterative testing to isolate winning features in test promotions.

Generally speaking, each individual test promotion may be designed to test one or more test promotion variables. These test promotions variables may relate to, for example, the size, shape, color, manner of display, manner of discount, manner of publicizing, manner of dissemination pertaining to the goods/services being promoted.

As a very simple example, one test promotion may involve 12-oz packages of fancy-cut potato chips with medium salt and a discount of 30% off the regular price. This test promotion may be tested on a purposefully segmented subpopulation of 35-40 years old professionals in the $30,000-$50,000 annual income range. Another test promotion may involve the same 30% discount 12-oz packages of fancy-cut potato chips with medium salt on a different purposefully segmented subpopulation of 35-40 years old professionals in the higher $100,000-$150,000 annual income range. By controlling all variables except for income range, the responses of these two test promotions, if repeated in statistically significant numbers, would likely yield fairly accurate information regarding the relationship between income for 35-40 years old professionals and their actual preference for 12-oz packages of fancy cut potato chips with medium salt. Further, the results of the given promotion may yield statistically relevant information when subjected to post-analysis. Since the user identification is known, the variables constituting the individuals who positively respond to a promotion may be compared against those who negatively responded to the promotion. If a variable if found to be different between these two cohorts in a statistically meaningful way, this information may be utilized to further refine the segments. Returning to the above example, suppose there is a sharp difference in promotion redemption between men and women in the 35-40 years old professionals in the $30,000-$50,000 annual income range. If the redemption rates differ by a statistically relevant amount, this larger segment can be divided into two new profile segments that have differing associations to the tested promotion.

In designing different test promotions, one or more of the test promotions variables may vary, or one or more of the segmenting criteria employed to create the purposefully segmented subpopulations may vary. The test promotion responses from individuals in the subpopulations are then collected and analyzed to ascertain which test promotion or test promotion variable(s) yields/yield the most desirable response (based on some predefined success criteria, for example).

Further, the test promotions can also reveal insights regarding which subpopulation performs the best, or well, with respect to test promotion responses. In this manner, test promotion response analysis provides insights not only regarding the relative performance of the test promotion and/or test promotion variable but also insights regarding population segmentation and/or segmentation criteria. In an embodiment, when there is an absence of good segmentation data, it is contemplated that the segments may be arbitrarily or randomly segmented into groups and test promotions may be executed against these arbitrarily segmented groups in order to obtain insights regarding personal characteristics that respond well to a particular type of promotion. This data can be utilized to generate initial segments for further testing in order to refine the segmentation information, or to confirm associations between promotions and segmentation variables.

In an embodiment, the identified test promotion variable(s) that yield the most desirable responses may then be employed to formulate a promotion that is specifically responsive to a particular segment, which may then be offered to the entire population segment (which typically is much larger than the test population). A segment wide promotion is different from a test promotion in that a segment wide promotion is a promotion designed to be offered to members of the entire segment to increase or maximize sales or profit whereas a test promotion is designed to be targeted to a small group of individuals fitting a specific segmentation criteria for the purpose of promotion testing. Examples of segment wide promotions include (but not limited to) advertisement printed in newspapers that generally circulate to a given segment, release in public forums and websites associated with the segments, flyers for general distribution to geographic regions having proportionately higher numbers of the target segments, announcement on radios or television that are again targeting the segments, and/or promotion broadly transmitted or made available to members of the public where there is a belief the target segments are likely to be consumers of the promotion. The segment wide promotion may take the form of a paper or electronic circular that offers the same promotion to the larger segment, for example.

Alternatively or additionally, promotion testing may be iterated over and over with different subpopulations (segmented using the same or different segmenting criteria) and different test promotions (devised using the same or different combinations of test promotion variables) in order to validate one or more the test promotion response analysis result(s) prior to the formation of the segment wide promotion. In this manner, "false positives" may be reduced.

Since a test promotion may involve many test promotion variables, iterative test promotion testing, as mentioned, may help pin-point a variable (i.e., promotion feature) that yields the most desirable test promotion response to a particular subpopulation profile.

Suppose, for example, that a manufacturer wishes to find out the most effective test promotion for packaged potato chips, and the profiles that respond best to said promotions. One test promotion may reveal that consumers tend to buy a greater quantity of potato chips when packaged in brown paper bags versus green paper bags. That "winning" test promotion variable value (i.e., brown paper bag packaging) may be retested in another set of test promotions using different combinations of test promotion variables (such as for example with different prices, different display options, etc.) on the same or different purposefully segmented subpopulations. The follow-up test promotions may be iterated multiple times in different test promotion variable combinations and/or with different test subpopulations to validate that there is, for example, a significant consumer preference for brown paper bag packaging over other types of packaging for potato chips.

Further, individual "winning" test promotion variable values from different test promotions may be combined to enhance the efficacy of the segment wide promotion to be created. For example, if a 2-for-1 discount is found to be another winning variable value (e.g., consumers tend to buy a greater quantity of potato chips when offered a 2-for-1 discount), that winning test promotion variable value (e.g., the aforementioned 2-for-1 discount) of the winning test promotion variable (e.g., discount depth) may be combined with the brown paper packaging winning variable value to yield a promotion that involves discounting 2-for-1 potato chips in brown paper bag packaging.

The promotion involving discounting 2-for-1 potato chips in brown paper bag packaging may be tested further to validate the hypothesis that such a combination elicits a more desirable response than the response from test promotions using only brown paper bag packaging or from test promotions using only 2-for-1 discounts. As many of the "winning" test promotion variable values may be identified and combined in a single promotion as desired. At some point, a combination of "winning" test promotion variables (involving one, two, three, or more "winning" test promotion variables) may be employed to create the general public promotion, in one or more embodiments.

In one or more embodiments, test promotions may be executed iteratively and/or in a continual fashion on different purposefully segmented subpopulations using different combinations of test promotion variables to continue to obtain insights into consumer actual revealed preferences, even as those preferences change over time. Note that the consumer responses that are obtained from the test promotions are actual revealed preferences instead of stated preferences. In other words, the data obtained from the test promotions administered in accordance with embodiments of the invention pertains to what individual consumers actually do when presented with the actual promotions. The data is tracked and available for analysis and/or verification in individual computer-implemented accounts of individual consumers involved in the test promotions. This revealed preference approach is opposed to a stated preference approach, which stated preference data is obtained when the consumer states what he would hypothetically do in response to, for example, a hypothetically posed conjoint test question.

As such, the actual preference test promotion response data obtained in accordance with embodiments of the present invention is a more reliable indicator of what a segment wide member may be expected to behave when presented with the same or a similar promotion in a segment wide promotion. Accordingly, there is a closer relationship between the test promotion response behavior (obtained in response to the test promotions) and the segment wide response behavior when a segment wide promotion is generated based on such test promotion response data.

Also, the lower face validity of a stated preference test, even if the insights have statistical relevance, poses a practical challenge; CPG manufacturers who conduct such tests have to then communicate the insights to a retailer in order to drive real-world behavior, and convincing retailers of the validity of these tests after the fact can lead to lower credibility and lower adoption, or "signal loss" as the top concepts from these tests get re-interpreted by a third party, the retailer, who wasn't involved in the original test design.

It should be pointed out that embodiments of the inventive test promotion optimization methods and apparatuses disclosed herein operate on a forward-looking basis in that the plurality of test promotions are generated and tested on segmented subpopulations in advance of the formulation of a general public promotion. In other words, the analysis results from executing the plurality of test promotions on different purposefully segmented subpopulations are employed to generate future segment wide promotions. In this manner, data regarding the "expected" efficacy of the proposed segment wide promotion is obtained even before the proposed segment wide promotion is released to the public. This is one key driver in obtaining highly effective segment wide promotions at low cost.

Furthermore, the subpopulations can be generated with highly granular segmenting criteria, allowing for control of data noise that may arise due to a number of factors, some of which may be out of the control of the manufacturer or the merchant. This is in contrast to the aggregated data approach of the prior art.

For example, if two different test promotions are executed on two subpopulations shopping at the same merchant on the same date, variations in the response behavior due to time of day or traffic condition are essentially eliminated or substantially minimized in the results (since the time or day or traffic condition would affect the two subpopulations being tested in substantially the same way).

The test promotions themselves may be formulated to isolate specific test promotion variables (such as the aforementioned potato chip brown paper packaging or the 16-oz size packaging). This is also in contrast to the aggregated data approach of the prior art.

Accordingly, individual winning promotion variables may be isolated and combined to result in a more effective promotion campaign in one or more embodiments. Further, the test promotion response data may be analyzed to answer questions related to specific subpopulation attribute(s) or specific test promotion variable(s). With embodiments of the invention, it is now possible to answer, from the test subpopulation response data, questions such as "How deep of a discount is required to increase by 10% the volume of potato chip purchased by buyers who are 18-25 year-old male shopping on a Monday?" or to generate test promotions specifically designed to answer such a question. Such data granularity and analysis result would have been impossible to achieve using the backward-looking, aggregate historical data approach of the prior art.

In one or more embodiments, there is provided a promotional idea module for generating ideas for promotional concepts to test. The promotional idea generation module relies on a series of pre-constructed sentence structures that outline typical promotional constructs. For example, Buy X, get Y for $Z price would be one sentence structure, whereas Get Y for $Z when you buy X would be a second. It's important to differentiate that the consumer call to action in those two examples is materially different, and one cannot assume the promotional response will be the same when using one sentence structure vs. another. The solution is flexible and dynamic, so once X, Y, and Z are identified, multiple valid sentence structures can be tested. Additionally, other variables in the sentence could be changed, such as replacing "buy" with "hurry up and buy" or "act now" or "rush to your local store to find". The solution delivers a platform where multiple products, offers, and different ways of articulating such offers can be easily generated by a lay user. The amount of combinations to test can be infinite. Further, the generation may be automated, saving time and effort in generating promotional concepts. In following sections one mechanism, the design matrix, for the automation of promotional generation will be provided in greater detail.

In one or more embodiments, once a set of concepts is developed, the technology advantageously a) will constrain offers to only test "viable promotions", i.e., those that don't violate local laws, conflict with branding guidelines, lead to unprofitable concepts that wouldn't be practically relevant, can be executed on a retailers' system, etc., and/or b) link to the design of experiments for micro-testing to determine which combinations of variables to test at any given time.

In one or more embodiments, there is provided an offer selection module for enabling a non-technical audience to select viable offers for the purpose of planning traditional promotions (such as segment wide promotion, for example) outside the test environment. By using filters and advanced consumer-quality graphics, the offer selection module will be constrained to only show top performing concepts from the tests, with production-ready artwork wherever possible. By doing so, the offer selection module renders irrelevant the traditional, Excel-based or heavily numbers-oriented performance reports from traditional analytic tools. The user can have "freedom within a framework" by selecting any of the pre-scanned promotions for inclusion in an offer to the population segment, but value is delivered to the retailer or manufacturer because the offers are constrained to only include the best performing concepts for the given segment. Deviation from the top concepts can be accomplished, but only once the specific changes are run through the testing process and emerge in the offer selection windows.

In an embodiment, it is expressly contemplated that the segment wide population and/or subpopulations may be chosen from social media site (e.g., Facebook™, Twitter™, Google+™, etc.) participants. Social media offers a large population of active participants and often provide various communication tools (e.g., email, chat, conversation streams, running posts, etc.) which makes it efficient to offer promotions and to receive responses to the promotions. Various tools and data sources exist to uncover characteristics of social media site members, which characteristics (e.g., age, sex, preferences, attitude about a particular topic, etc.) may be employed as highly granular segmentation criteria, thereby simplifying segmentation planning.

Although grocery stores and other brick-and-mortar businesses are discussed in various examples herein, it is expressly contemplated that embodiments of the invention apply also to online shopping and online advertising/promotion and online members/customers.

These and other features and advantages of embodiments of the invention may be better understood with reference to the figures and discussions that follow.

Figure 2A:
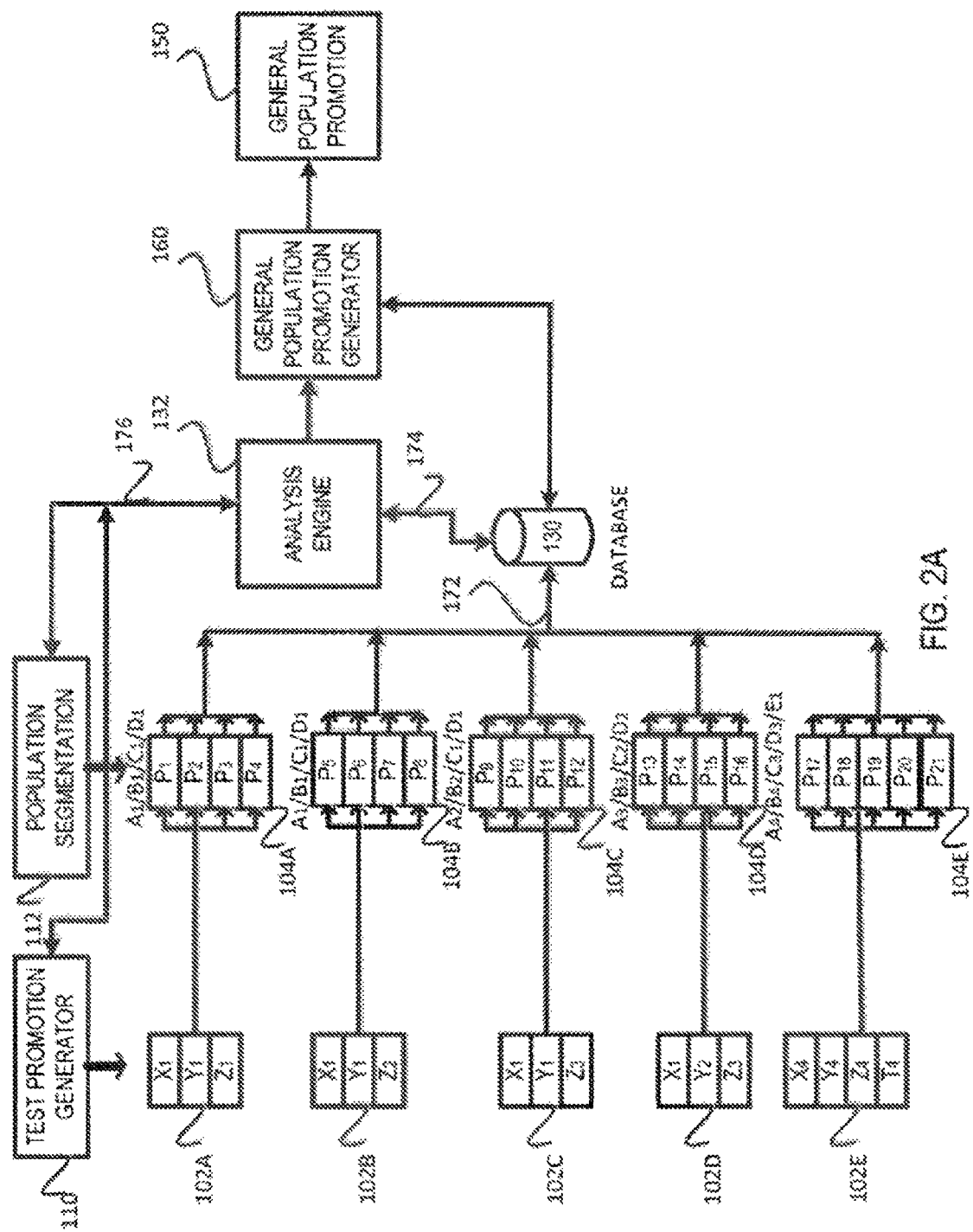
FIG. 2A shows, in accordance with an embodiment of the invention, a conceptual drawing of the forward-looking promotion optimization method.

FIG. 2A shows, in accordance with an embodiment of the invention, a conceptual drawing of the forward-looking promotion optimization method. As shown in FIG. 2A, a plurality of test promotions 102a, 102b, 102c, 102d, and 102e are administered to purposefully segmented subpopulations 104a, 104b, 104c, 104d, and 104e respectively. As mentioned, each of the test promotions (102a-102e) may be designed to test one or more test promotion variables.

In the example of FIG. 2A, test promotions 102a-102d are shown testing three test promotion variables X, Y, and Z, which may represent for example the size of the packaging (e.g., 12 oz versus 16 oz), the manner of display (e.g., at the end of the aisle versus on the shelf), and the discount (e.g., 10% off versus 2-for-1). These promotion variables are of course only illustrative and almost any variable involved in producing, packaging, displaying, promoting, discounting, etc. of the packaged product may be deemed a test promotion variable if there is an interest in determining how the consumer would respond to variations of one or more of the test promotion variables. Further, although only a few test promotion variables are shown in the example of FIG. 2A, a test promotion may involve as many or as few of the test promotion variables as desired. For example, test promotion 102e is shown testing four test promotion variables (X, Y, Z, and T).

One or more of the test promotion variables may vary from test promotion to test promotion. In the example of FIG. 2A, test promotion 102a involves test variable X1 (representing a given value or attribute for test variable X) while test promotion 102b involves test variable X2 (representing a different value or attribute for test variable X). A test promotion may vary, relative to another test promotion, one test promotion variable (as can be seen in the comparison between test promotions 102a and 102b) or many of the test promotion variables (as can be seen in the comparison between test promotions 102a and 102d). Also, there are no requirements that all test promotions must have the same number of test promotion variables (as can be seen in the comparison between test promotions 102a and 102e) although for the purpose of validating the effect of a single variable, it may be useful to keep the number and values of other variables (i.e., the control variables) relatively constant from test to test (as can be seen in the comparison between test promotions 102a and 102b).

Generally speaking, the test promotions may be generated using automated test promotion generation software 110, which varies for example the test promotion variables and/or the values of the test promotion variables and/or the number of the test promotion variables to come up with different test promotions.

In the example of FIG. 2A, purposefully segmented subpopulations 104a-104d are shown segmented using four segmentation criteria A, B, C, D, which may represent for example the age of the consumer, the household income, the zip code, and whether the person is known from past purchasing behavior to be a luxury item buyer or a value item buyer. These segmentation criteria are of course only illustrative and almost any demographics, behavioral, attitudinal, whether self-described, objective, interpolated from data sources (including past purchase or current purchase data), etc. may be used as segmentation criteria if there is an interest in determining how a particular subpopulation would likely respond to a test promotion. Further, although only a few segmentation criteria are shown in connection with subpopulations 104a-104d in the example of FIG. 2A, segmentation may involve as many or as few of the segmentation criteria as desired. For example, purposefully segmented subpopulation 104e is shown segmented using five segmentation criteria (A, B, C, D, and E).

In the present disclosure, a distinction is made between a purposefully segmented subpopulation and a randomly segmented subpopulation. The former denotes a conscious effort to group individuals based on one or more segmentation criteria or attributes. The latter denotes a random grouping for the purpose of forming a group irrespective of the attributes of the individuals. Randomly segmented subpopulations are useful in some cases when there is a lack of information relating to what segment attributes are statistically significant to a given promotion; however they are distinguishable from purposefully segmented subpopulations when the differences are called out.

One or more of the segmentation criteria may vary from purposefully segmented subpopulation to purposefully segmented subpopulation. In the example of FIG. 2A, purposefully segmented subpopulation 104a involves segmentation criterion value A1 (representing a given attribute or range of attributes for segmentation criterion A) while purposefully segmented subpopulation 104c involves segmentation criterion value A2 (representing a different attribute or set of attributes for the same segmentation criterion A).

As can be seen, different purposefully segmented subpopulation may have different numbers of individuals. As an example, purposefully segmented subpopulation 104a has four individuals (P1-P4) whereas purposefully segmented subpopulation 104e has six individuals (P17-P22). A purposefully segmented subpopulation may differ from another purposefully segmented subpopulation in the value of a single segmentation criterion (as can be seen in the comparison between purposefully segmented subpopulation 104a and purposefully segmented subpopulation 104c wherein the attribute A changes from A1 to A2) or in the values of many segmentation criteria simultaneously (as can be seen in the comparison between purposefully segmented subpopulation 104a and purposefully segmented subpopulation 104d wherein the values for attributes A, B, C, and D are all different). Two purposefully segmented subpopulations may also be segmented identically (i.e., using the same segmentation criteria and the same values for those criteria) as can be seen in the comparison between purposefully segmented subpopulation 104a and purposefully segmented subpopulation 104b.

Also, there are no requirements that all purposefully segmented subpopulations must be segmented using the same number of segmentation criteria (as can be seen in the comparison between purposefully segmented subpopulation 104a and 104e wherein purposefully segmented subpopulation 104e is segmented using five criteria and purposefully segmented subpopulation 104a is segmented using only four criteria) although for the purpose of validating the effect of a single criterion, it may be useful to keep the number and values of other segmentation criteria (e.g., the control criteria) relatively constant from purposefully segmented subpopulation to purposefully segmented subpopulation.

Generally speaking, the purposefully segmented subpopulations may be generated using automated segmentation software 112, which varies for example the segmentation criteria and/or the values of the segmentation criteria and/or the number of the segmentation criteria to come up with different purposefully segmented subpopulations. Details of a segmentation module capable of executing this segmentation software will be described in greater detail below.

In one or more embodiments, the test promotions are administered to individual users in the purposefully segmented subpopulations in such a way that the responses of the individual users in that purposefully segmented subpopulation can be recorded for later analysis. As an example, an electronic coupon may be presented in an individual user's computer-implemented account (e.g., shopping account or loyalty account), or emailed or otherwise transmitted to the smart phone of the individual. In an example, the user may be provided with an electronic coupon on his smart phone that is redeemable at the merchant. In FIG. 2A, this administering is represented by the lines that extend from test promotion 102a to each of individuals P1-P4 in purposefully segmented subpopulation 104a. If the user (such as user P1) makes a promotion-significant response, the response is noted in database 130.

A promotion-significant response is defined as a response that is indicative of some level of interest or disinterest in the goods/service being promoted. In the aforementioned example, if the user P1 redeems the electronic coupon at the store, the redemption is strongly indicative of user P1's interest in the offered goods. However, responses falling short of actual redemption or actual purchase may still be significant for promotion analysis purposes. For example, if the user saves the electronic coupon in his electronic coupon folder on his smart phone, such action may be deemed to indicate a certain level of interest in the promoted goods. As another example, if the user forwards the electronic coupon to his friend or to a social network site, such forwarding may also be deemed to indicate another level of interest in the promoted goods. As another example, if the user quickly moves the coupon to trash, this action may also indicate a level of strong disinterest in the promoted goods. In one or more embodiments, weights may be accorded to various user responses to reflect the level of interest/disinterest associated with the user's responses to a test promotion. For example, actual redemption may be given a weight of 1, whereas saving to an electronic folder would be given a weight of only 0.6 and whereas an immediate deletion of the electronic coupon would be given a weight of −0.5.

Analysis engine 132 represents a software engine for analyzing the consumer responses to the test promotions. Response analysis may employ any analysis technique (including statistical analysis) that may reveal the type and degree of correlation between test promotion variables, subpopulation attributes, and promotion responses. Analysis engine 132 may, for example, ascertain that a certain test promotion variable value (such as 2-for-1 discount) may be more effective than another test promotion variable (such as 25% off) for 32-oz soft drinks if presented as an electronic coupon right before Monday Night Football. Such correlation may be employed to formulate a general population promotion (150) or a segment wide promotion by a general promotion generator software (160). As can be appreciated from this discussion sequence, the optimization is a forward-looking optimization in that the results from test promotions administered in advance to purposefully segmented subpopulations are employed to generate a segment wide promotion to be released to the public at a later date.

In one or more embodiments, the correlations ascertained by analysis engine 132 may be employed to generate additional test promotions (arrows 172, 174, and 176) to administer to the same or a different set of purposefully segmented subpopulations. The iterative testing may be employed to verify the consistency and/or strength of a correlation (by administering the same test promotion to a different purposefully segmented subpopulation or by combining the "winning" test promotion value with other test promotion variables and administering the re-formulated test promotion to the same or a different set of purposefully segmented subpopulations).

In one or more embodiments, a "winning" test promotion value (e.g., 20% off listed price) from one test promotion may be combined with another "winning" test promotion value (e.g., packaged in plain brown paper bags) from another test promotion to generate yet another test promotion. The test promotion that is formed from multiple "winning" test promotion values may be administered to different purposefully segmented subpopulations to ascertain if such combination would elicit even more desirable responses from the test subjects.

Since the purposefully segmented subpopulations are small and may be segmented with highly granular segmentation criteria, a large number of test promotions may be generated (also with highly granular test promotion variables) and a large number of combinations of test promotions/purposefully segmented subpopulations can be executed quickly and at a relatively low cost. The same number of promotions offered as segment wide promotions would have been prohibitively expensive to implement, and the large number segment wide promotions would have been costly for the manufacturers/retailers. In contrast, if a test promotion fails, the fact that the test promotion was offered to only a small number of consumers in one or more segmented subpopulations would limit the cost of failure. Thus, even if a large number of these test promotions "fail" to elicit the desired responses, the cost of conducting these small test promotions would still be relatively small.

In an embodiment, it is envisioned that dozens, hundreds, or even thousands of these test promotions may be administered concurrently or staggered in time to the dozens, hundreds or thousands of segmented subpopulations. Further, the large number of test promotions executed (or iteratively executed) improves the statistical validity of the correlations ascertained by analysis engine. This is because the number of variations in test promotion variable values, subpopulation attributes, etc. can be large, thus yielding rich and granulated result data. The data-rich results enable the analysis engine to generate highly granular correlations between test promotion variables, subpopulation attributes, and type/degree of responses, as well as track changes over time. In turn, these more accurate/granular correlations help improve the probability that a segment wide promotion created from these correlations would likely elicit the desired response from the entire segment. It would also, over, time, create promotional profiles for specific categories, brands, retailers, and individual shoppers where, e.g., shopper 1 prefers contests and shopper 2 prefers instant financial savings. This is known as profile to promotion matching, and will be explored in further detail below.

Figure 2B:
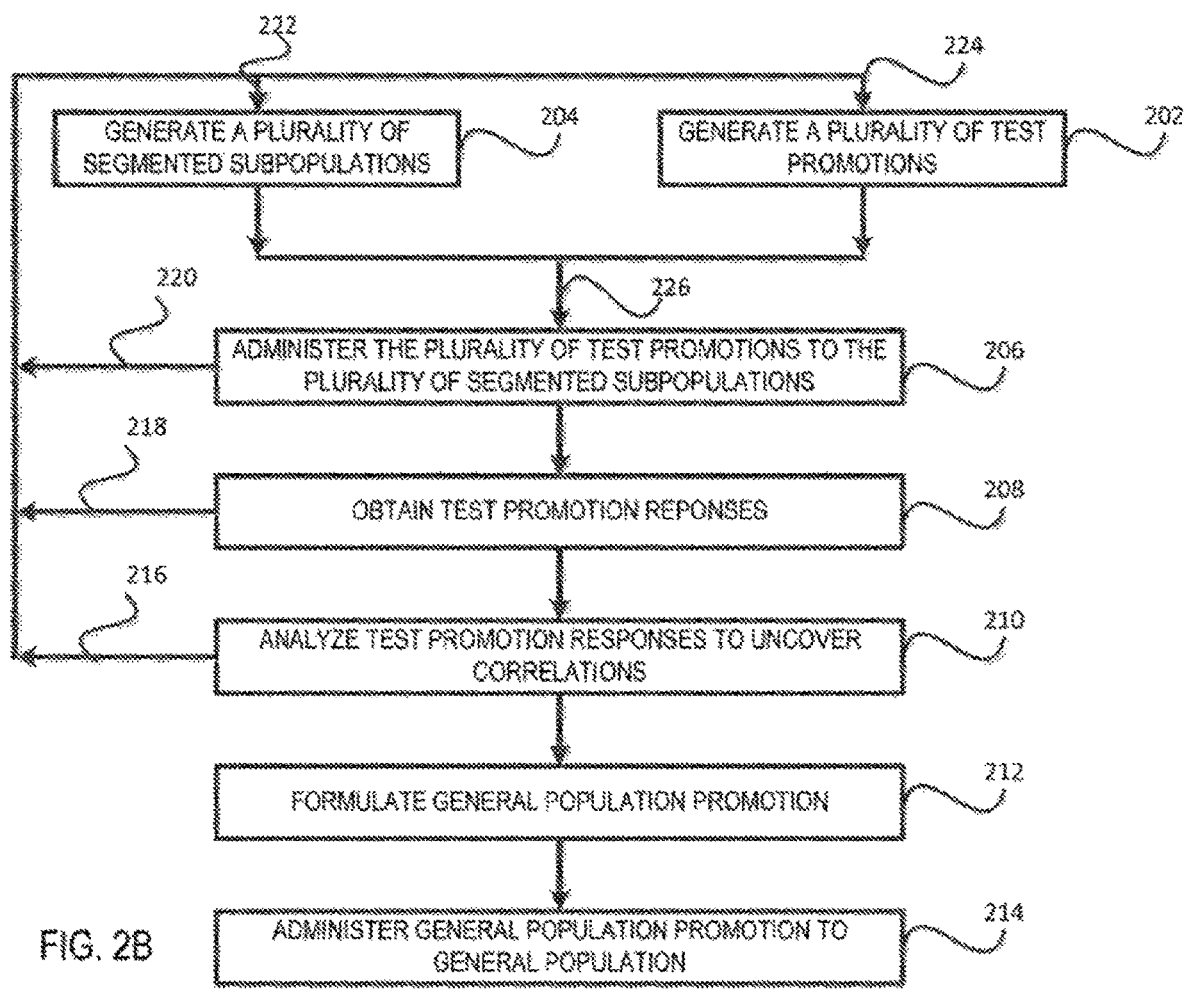
FIG. 2B shows, in accordance with an embodiment of the invention, the steps for generating a general public promotion.

FIG. 2B shows, in accordance with an embodiment of the invention, the steps for generating a general public promotion. In one or more embodiments, each, some, or all the steps of FIG. 2B may be automated via software to automate the forward-looking promotion optimization process. In step 202, the plurality of test promotions are generated. These test promotions have been discussed in connection with test promotions 102a-102e of FIG. 2A and represent the plurality of actual promotions administered to small purposefully segmented subpopulations to allow the analysis engine to uncover highly accurate/granular correlations between test promotion variables, subpopulation attributes, and type/degree of responses in an embodiment, these test promotions may be generated using automated test promotion generation software that varies one or more of the test promotion variables, either randomly, according to heuristics, and/or responsive to hypotheses regarding correlations from analysis engine 132 for example.

In step 204, the segmented subpopulations are generated. In an embodiment, the segmented subpopulations represent randomly segmented subpopulations. In another embodiment, the segmented subpopulations represent purposefully segmented subpopulations. In another embodiment, the segmented subpopulations may represent a combination of randomly segmented subpopulations and purposefully segmented subpopulations. In an embodiment, these segmented subpopulations may be generated using automated subpopulation segmentation software that varies one or more of the segmentation criteria, either randomly, according to heuristics, and/or responsive to hypotheses regarding correlations from analysis engine 132, for example.

In step 206, the plurality of test promotions generated in step 202 are administered to the plurality of segmented subpopulations generated in step 204. In an embodiment, the test promotions are administered to individuals within the segmented subpopulation and the individual responses are obtained and recorded in a database (step 208).

In an embodiment, automated test promotion software automatically administers the test promotions to the segmented subpopulations using electronic contact data that may be obtained in advance from, for example, social media sites, a loyalty card program, previous contact with individual consumers, or potential consumer data purchased from a third party, etc. The responses may be obtained at the point of sale terminal, or via a website or program, via social media, or via an app implemented on smart phones used by the individuals, for example.

In step 210, the responses are analyzed to uncover correlations between test promotion variables, subpopulation attributes, and type/degree of responses.

In step 212, the general public promotion or segment wide promotion is formulated from the correlation data, which is uncovered by the analysis engine from data obtained via subpopulation test promotions. In an embodiment, the segment wide promotion may be generated automatically using segment wide promotion generation software which utilizes at least the test promotion variables and/or subpopulation segmentation criteria and/or test subject responses and/or the analysis provided by analysis engine 132.

In step 214, the general public promotion or segment wide promotion is released to the general public where a disproportionate number of the consumer segment is likely to consume the promotion is located in order to promote the goods/services.

In one or more embodiments, promotion testing using the test promotions on the segmented subpopulations occurs in parallel to the release of a segment wide promotion and may continue in an ongoing fashion to validate correlation hypotheses and/or to derive new segment wide promotions based on the same or different analysis results. If iterative promotion testing involving correlation hypotheses uncovered by analysis engine 132 is desired, the same test promotions or new test promotions may be generated and executed against the same segmented subpopulations or different segmented subpopulations as needed (paths 216/222/226 or 216/224/226 or 216/222/224/226). As mentioned, iterative promotion testing may validate the correlation hypotheses, serve to eliminate "false positives" and/or uncover combinations of test promotion variables that may elicit even more favorable or different responses from the test subjects.

Promotion testing may be performed on an on-going basis using the same or different sets of test promotions on the same or different sets of segmented subpopulations as mentioned (paths 218/222/226 or 218/224/226 or 218/222/224/226 or 220/222/226 or 220/224/226 or 220/222/224/226).

Figure 3A:
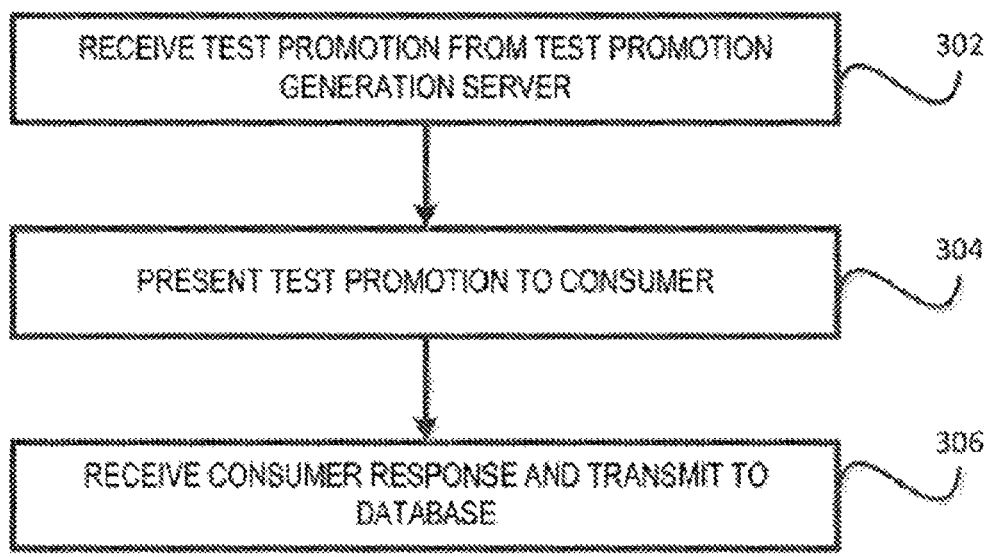
FIG. 3A shows in greater detail, in accordance with an embodiment of the invention, the administering step 206 of FIG. 2B from the user's perspective.

FIG. 3A shows in greater detail, in accordance with an embodiment of the invention, the administering step 206 of FIG. 2B from the user's perspective. In step 302, the test promotion is received from the test promotion generation server (which executes the software employed to generate the test promotion). As examples, the test promotion may be received at a user's smart phone or tablet (such as in the case of an electronic coupon or a discount code, along with the associated promotional information pertaining to the product, place of sale, time of sale, etc.) or in a computer-implemented account (such as a loyalty program account) associated with the user that is a member of the segmented subpopulation to be tested or via one or more social media sites. In step 304, the test promotion is presented to the user. In step 306, the user's response to the test promotion is obtained and transmitted to a database for analysis.

Figure 3B:
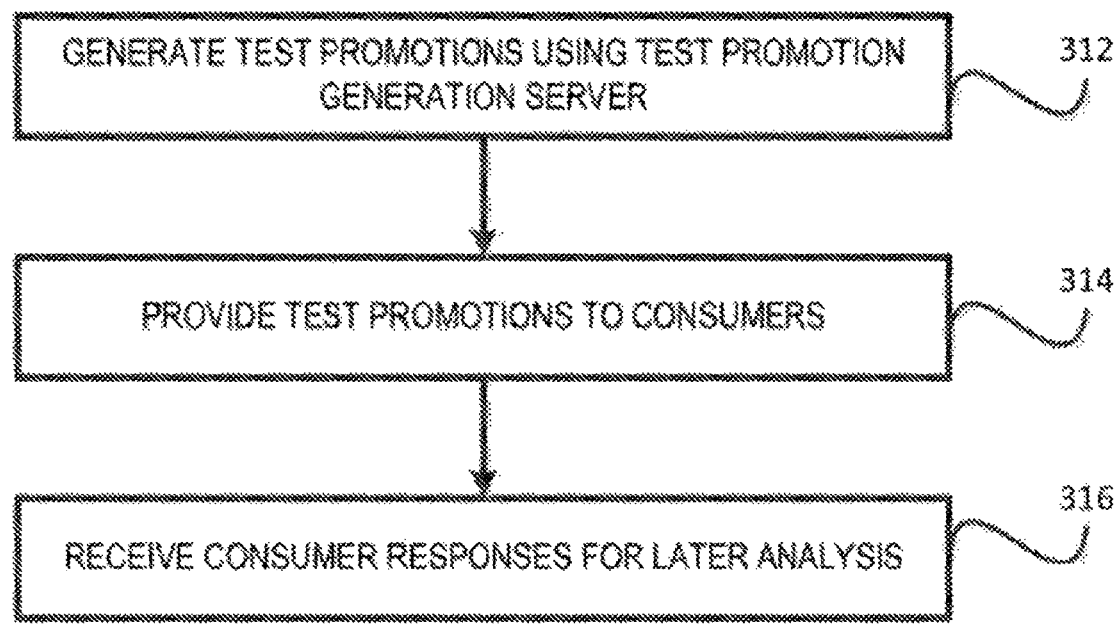
FIG. 3B shows in greater detail, in accordance with an embodiment of the invention, the administering step 206 of FIG. 2B from the forward-looking promotion optimization system perspective.

FIG. 3B shows in greater detail, in accordance with an embodiment of the invention, the administering step 206 of FIG. 2B from the forward-looking promotion optimization system perspective. In step 312, the test promotions are generated using the test promotion generation server (which executes the software employed to generate the test promotion). In step 314, the test promotions are provided to the users (e.g., transmitted or emailed to the user's smart phone or tablet or computer or shared with the user using the user's loyalty account). In step 316, the system receives the user's responses and stores the user's responses in the database for later analysis.

Figure 4:
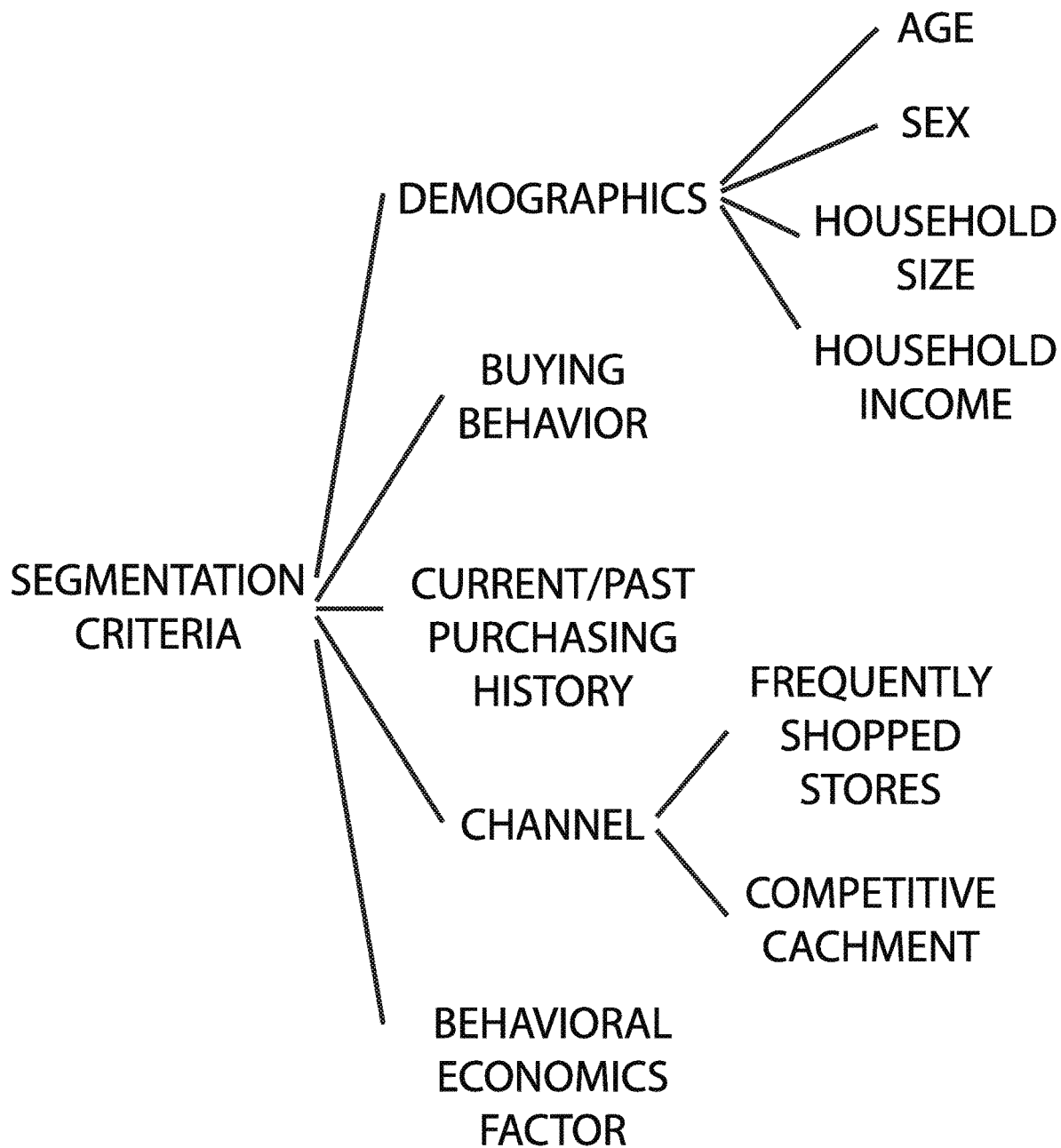
FIG. 4 shows various example segmentation criteria that may be employed to generate the purposefully segmented subpopulations.

FIG. 4 shows various example segmentation criteria that may be employed to generate the purposefully segmented subpopulations. As show in FIG. 4, demographics criteria (e.g., sex, location, household size, household income, etc.), buying behavior (category purchase index, most frequent shopping hours, value versus premium shopper, etc.), past/current purchase history, channel (e.g., stores frequently shopped at, competitive catchment of stores within driving distance), behavioral economics factors, etc. can all be used to generate with a high degree of granularity the segmented subpopulations. The examples of FIG. 4 are meant to be illustrative and not meant to be exhaustive or limiting. As mentioned, one or more embodiments of the invention generate the segmented subpopulations automatically using automated population segmentation software that generates the segmented subpopulations based on values of segmentation criteria.

Figure 5:
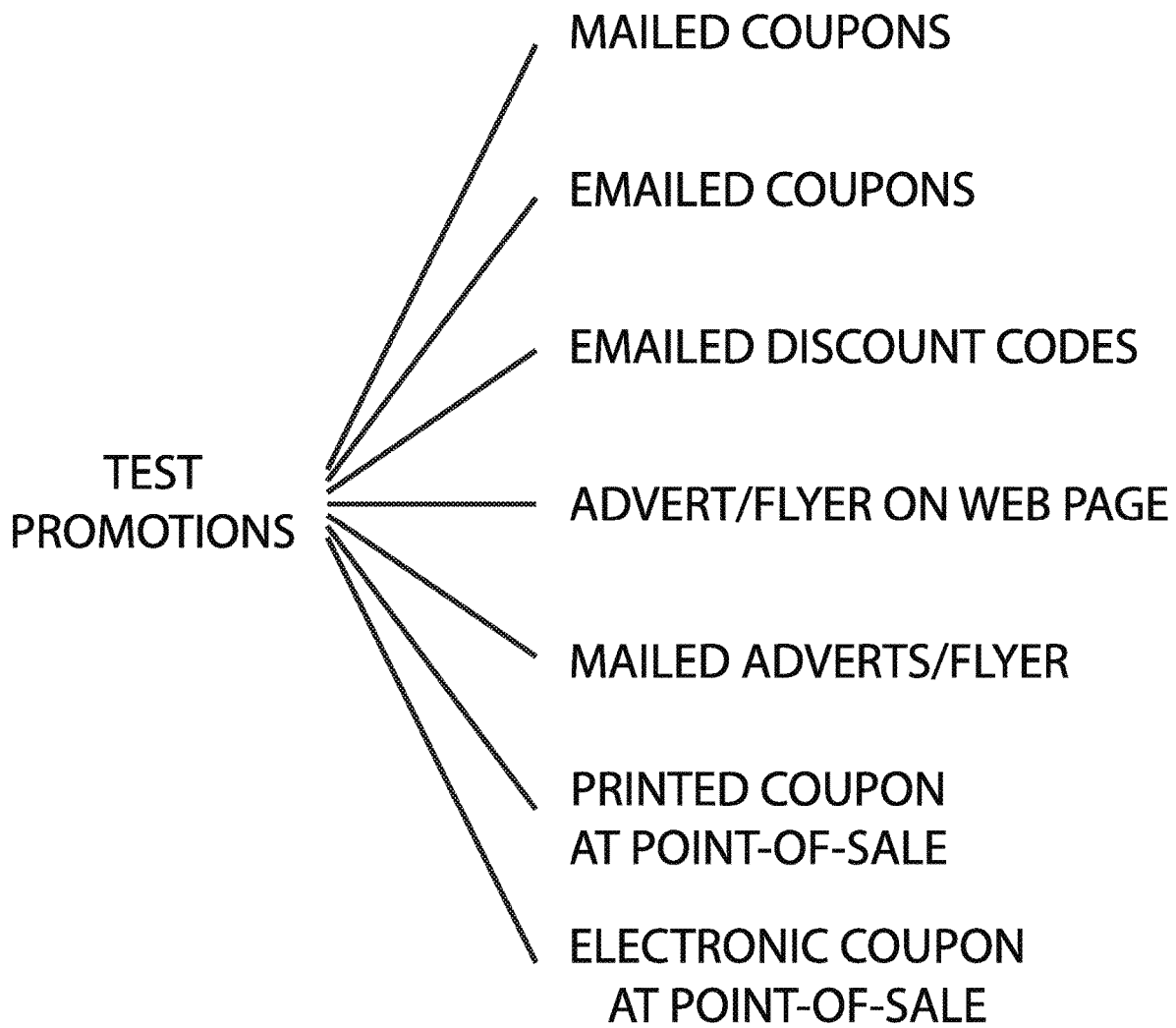
FIG. 5 shows various example methods for communicating the test promotions to individuals of the segmented subpopulations being tested.

FIG. 5 shows various example methods for communicating the test promotions to individuals of the segmented subpopulations being tested. As shown in FIG. 5, the test promotions may be mailed to the individuals, emailed in the form of text or electronic flyer or coupon or discount code, displayed on a webpage when the individual accesses his shopping or loyalty account via a computer or smart phone or tablet. Redemption may take place using, for example, a printed coupon (which may be mailed or may be printed from an electronic version of the coupon) at the point of sale terminal, an electronic version of the coupon (e.g., a screen image or QR code), the verbal providing or manual entry of a discount code into a terminal at the store or at the point of sale. The examples of FIG. 5 are meant to be illustrative and not meant to be exhaustive or limiting. One or more embodiments of the invention automatically communicate the test promotions to individuals in the segmented subpopulations using software that communicates/email/mail/administer the test promotions automatically. In this manner, subpopulation test promotions may be administered automatically, which gives manufacturers and retailers the ability to generate and administer a large number of test promotions with low cost/delay.

Figure 6:
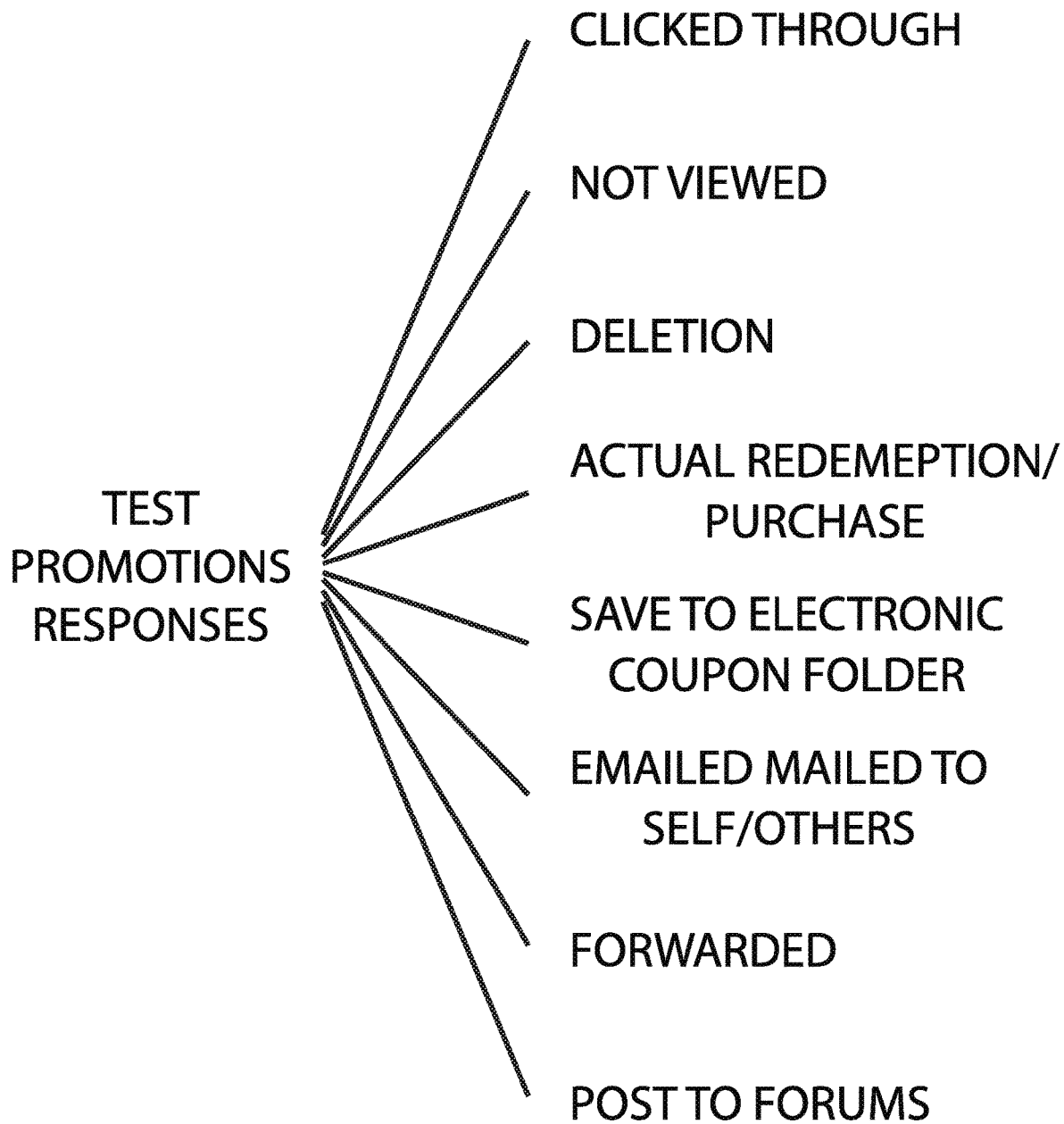
FIG. 6 shows, in accordance with an embodiment, various example promotion-significant responses.

FIG. 6 shows, in accordance with an embodiment, various example promotion-significant responses. As mentioned, redemption of the test offer is one strong indication of interest in the promotion. However, other consumer actions responsive to the receipt of a promotion may also reveal the level of interest/disinterest and may be employed by the analysis engine to ascertain which test promotion variable is likely or unlikely to elicit the desired response. Examples shown in FIG. 6 include redemption (strong interest), deletion of the promotion offer (low interest), save to electronic coupon folder (mild to strong interest), clicked to read further (mild interest), forwarding to self or others or social media sites (mild to strong interest). As mentioned, weights may be accorded to various consumer responses to allow the analysis engine to assign scores and provide user-interest data for use in formulating follow-up test promotions and/or in formulating the general public promotion. The examples of FIG. 6 are meant to be illustrative and not meant to be exhaustive or limiting.

Figure 7:
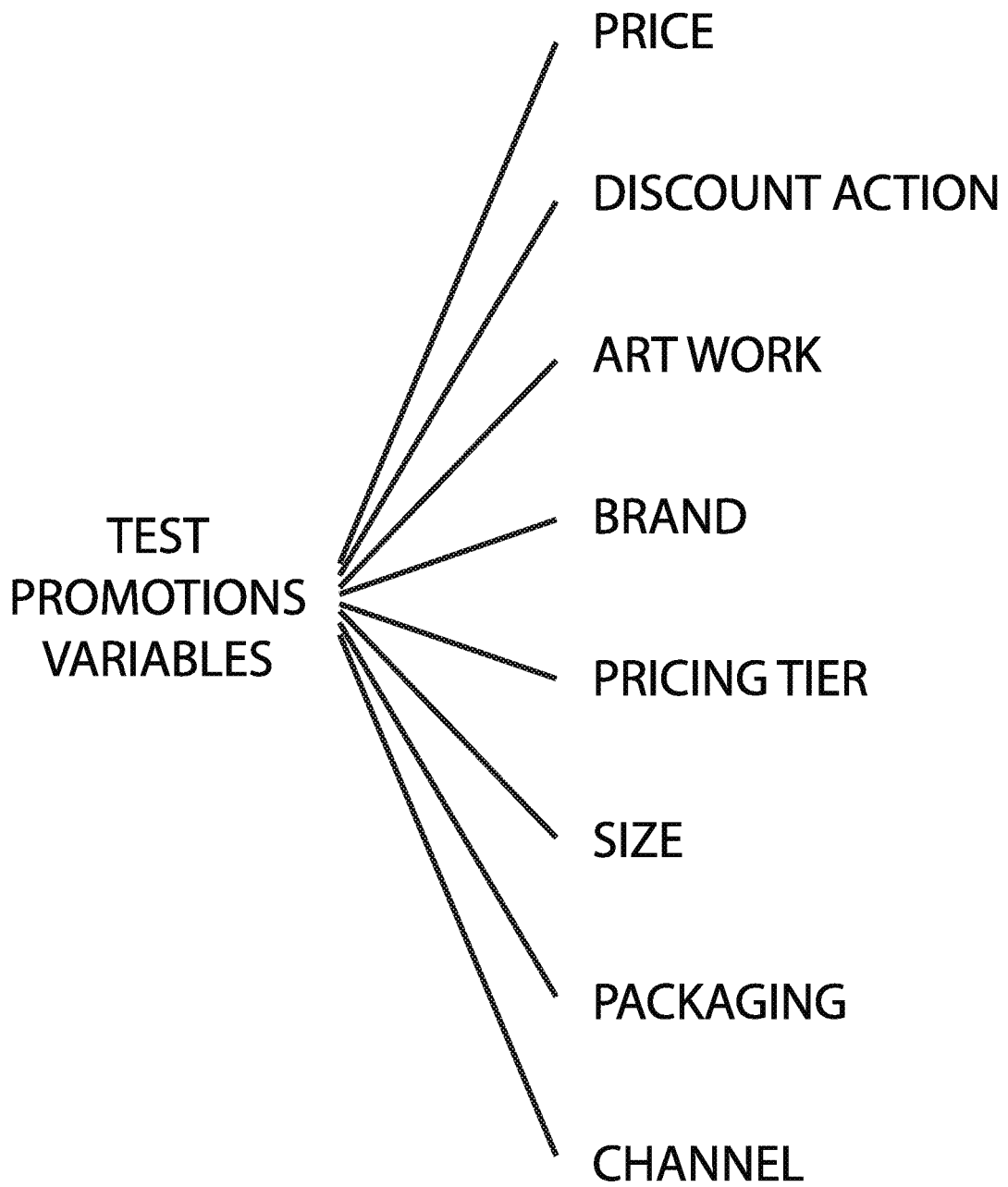
FIG. 7 shows, in accordance with an embodiment of the invention, various example test promotion variables affecting various aspects of a typical test promotion.

FIG. 7 shows, in accordance with an embodiment of the invention, various example test promotion variables affecting various aspects of a typical test promotion. As shown in FIG. 7, example test promotion variables include price, discount action (e.g., save 10%, save $1, 2-for-1 offer, etc.), artwork (e.g., the images used in the test promotion to draw interest), brand (e.g., brand X potato chips versus brand Y potato chips), pricing tier (e.g., premium, value, economy), size (e.g., 32 oz, 16 oz, 8 oz), packaging (e.g., single, 6-pack, 12-pack, paper, can, etc.), channel (e.g., email versus paper coupon versus notification in loyalty account). The examples of FIG. 7 are meant to be illustrative and not meant to be exhaustive or limiting. As mentioned, one or more embodiments of the invention involve generating the test promotions automatically using automated test promotion generation software by varying one or more of the test promotion variables, either randomly or based on feedback from the analysis of other test promotions or from the analysis of the general public promotion.

Figure 8:
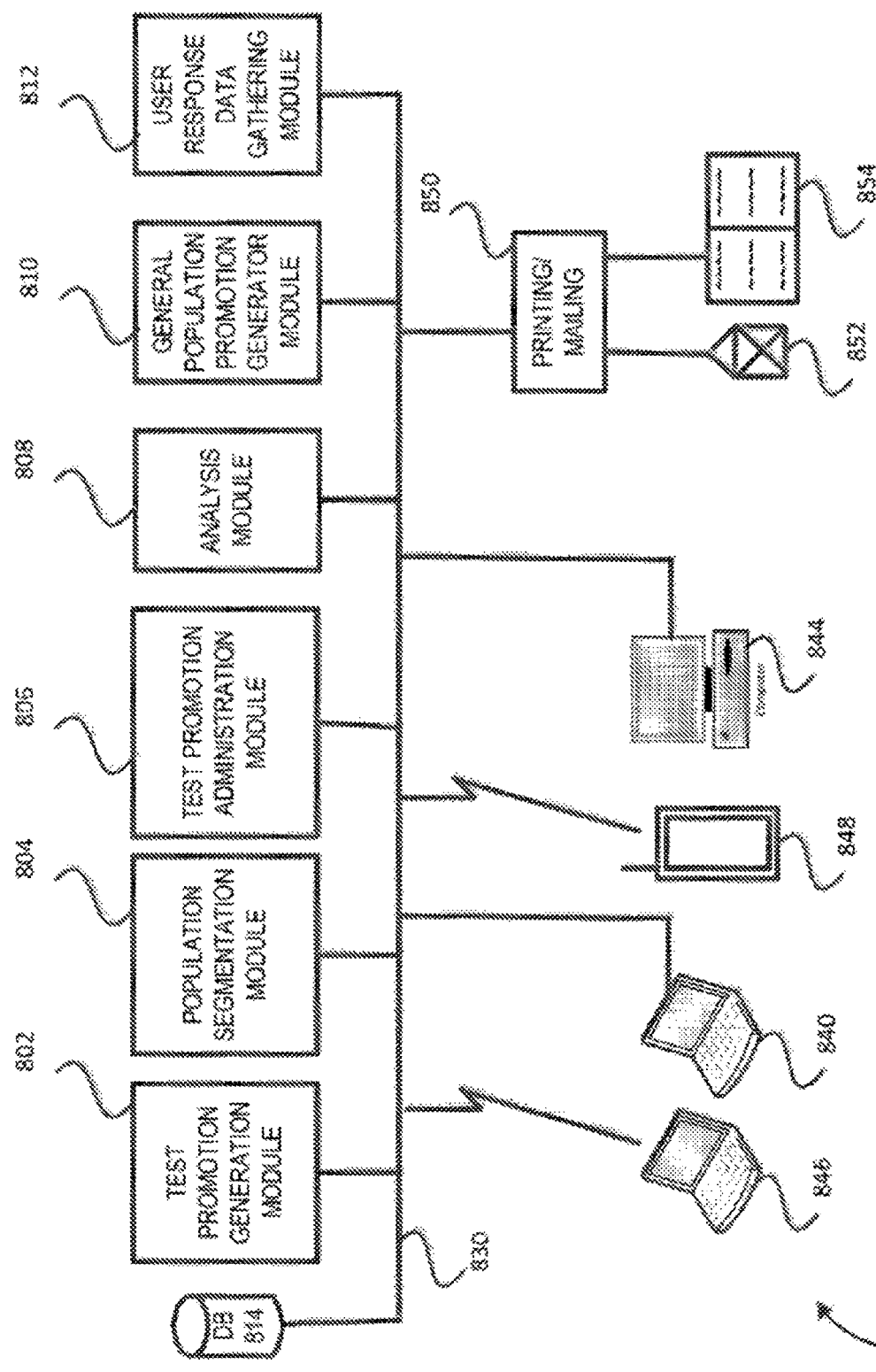
FIG. 8 shows, in accordance with an embodiment of the invention, a general hardware/network view of a forward-looking promotion optimization system capable of performing profile to promotion matching.

FIG. 8 shows, in accordance with an embodiment of the invention, a general hardware/network view of the forward-looking promotion optimization system 800 for the purpose of matching promotions to profile segments. In general, the various functions discussed may be implemented as software modules, which may be implemented in one or more servers (including actual and/or virtual servers). In FIG. 8, there is shown a test promotion generation module 802 for generating the test promotions in accordance with test promotion variables. There is also shown a population segmentation module 804 for generating the segmented subpopulations in accordance with segmentation criteria. There is also shown a test promotion administration module 806 for administering the plurality of test promotions to the plurality of segmented subpopulations. There is also shown an analysis module 808 for analyzing the responses to the test promotions as discussed earlier. There is also shown a general population promotion generation module 810 for generating the general population promotion or segment wide promotions using the analysis result of the data from the test promotions. There is also shown a module 812, representing the software/hardware module for receiving the responses. Module 812 may represent, for example, the point of sale terminal in a store, a shopping basket on an online shopping website, an app on a smart phone, a webpage displayed on a computer, a social media news feed, etc. where user responses can be received.

One or more of modules 802-812 may be implemented on one or more servers, as mentioned. A database 814 is shown, representing the data store for user data and/or test promotion and/or general public promotion data and/or response data. Database 814 may be implemented by a single database or by multiple databases. The servers and database(s) may be coupled together using a local area network, an intranet, the internet, or any combination thereof (shown by reference number 830).

User interaction for test promotion administration and/or acquiring user responses may take place via one or more of user interaction devices. Examples of such user interaction devices are wired laptop 840, wired computer 844, wireless laptop 846, wireless smart phone or tablet 848. Test promotions may also be administered via printing/mailing module 850, which communicates the test promotions to the users via mailings 852 or printed circular 854. The example components of FIG. 8 are only illustrative and are not meant to be limiting of the scope of the invention. The general public promotion, once generated, may also be communicated to the public using some or all of the user interaction devices/methods discussed herein.

As can be appreciated by those skilled in the art, providing a result-effective set of recommendations for a segment wide promotion is one of the more important tasks in test promotion optimization.

In one or more embodiments, there are provided adaptive experimentation and optimization processes for automated promotion testing. Testing is said to be automated when the test promotions are generated in the manner that is likely produce the desired response consistent with the goal of the segment wide promotion.

For example, if the goal is to maximize profit for the sale of a certain newly created brand of potato chips, embodiments of the invention optimally and adaptively, without using required human intervention, plan the test promotions, iterate through the test promotions to test the test promotion variables and segment attributes in the most optimal way, learn and validate such that the most result-effective set of test promotions can be derived for given population segments, and provide such result-effective set of test promotions as recommendations for segment wide promotions to achieve the goal of maximizing profit for the sale of the newly created brand of potato chips.

The term "without required human intervention" does not denote zero human intervention. The term however denotes that the adaptive experimentation and optimization processes for automated promotion testing can be executed without human intervention if desired. However, embodiments of the invention do not exclude the optional participation of humans, especially experts, in various phases of the adaptive experimentation and optimization processes for automated promotion testing if such participation is desired at various points to inject human intelligence or experience or timing or judgment in the adaptive experimentation and optimization processes for automated promotion testing process. Further, the term does not exclude the optional nonessential ancillary human activities that can otherwise also be automated (such as issuing the "run" command to begin generating test promotions or issuing the "send" command to send recommendations obtained).

II. Promotion to Profile Matching

Now that the broad concept of forward looking promotion optimization has been discussed in considerable detail, attention shall now be focused upon the systems and processes for matching profiles, once sufficiently defined, to specific profile variables. This is known as profile to promotion matching, and can be leveraged when future promotions are being generated to effectuate segment wide promotional activity.

Figure 9:
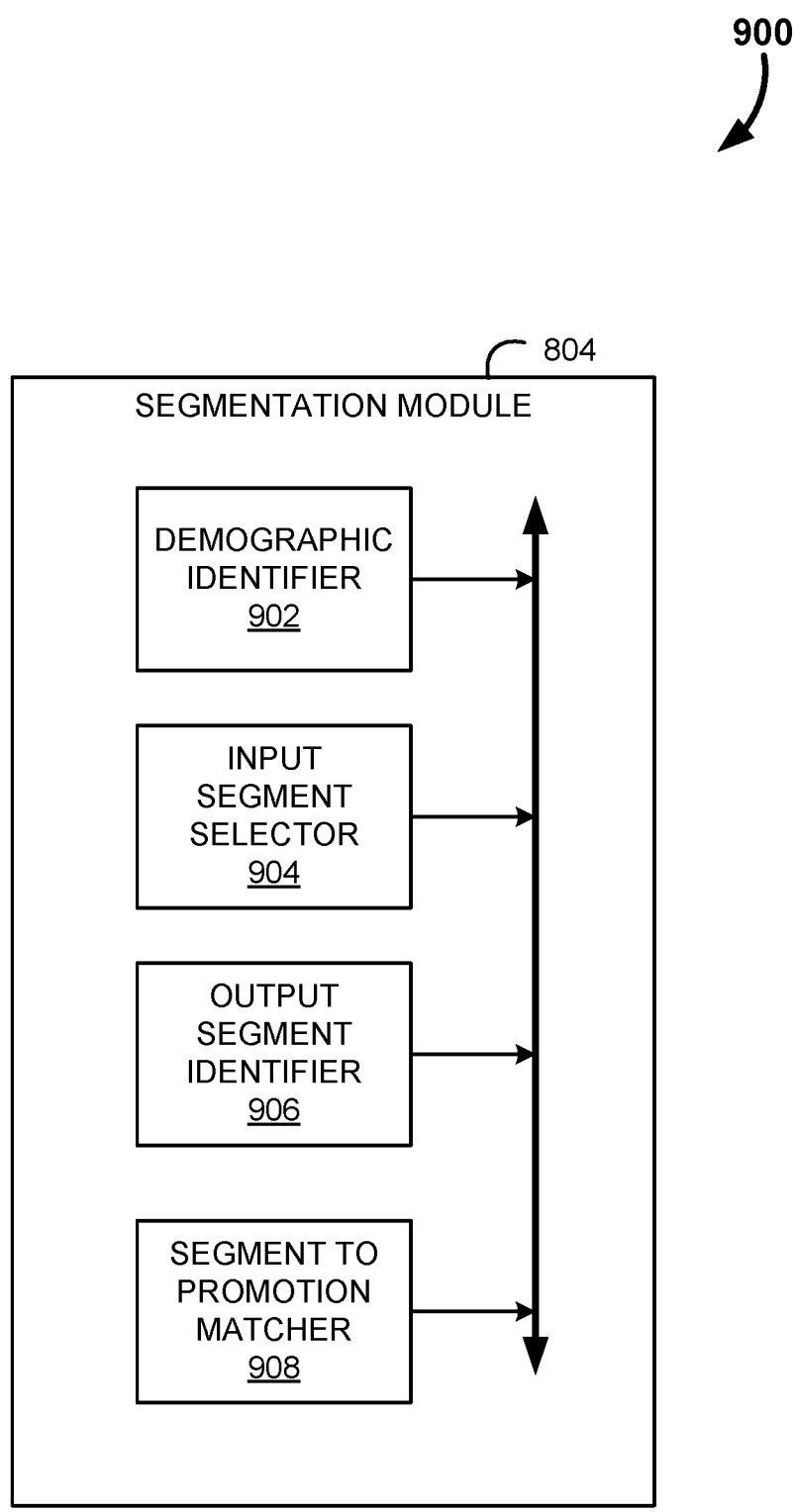
FIG. 9 shows, in accordance with an embodiment of the invention, a more detailed look into the segmentation module.

In FIG. 9, a more detailed illustration of the segmentation module 804 is described. The segmentation module 804 includes a number of subcomponents with discrete tasks. These subcomponents may be physically or logically coupled together in a server or similar computing environment. The subcomponents include a demographic identifier 902, an input segment selector 904, and output segment identifier 906 and a segment to promotion matcher 908.

The demographic identifier 902 identifies population attributes that may be employed to segment a given population into profiles. As discussed above this may include a wide variety of attributes beyond mere demographics, including profession, income, race, location, preferences, prior purchasing behavior, interests, friends/social interactions, and the like. These attributes may be combined and utilized to parse out specific subpopulations.

The input segment selector 904 chooses which attributes will be utilized to segment the subpopulations for testing. This may utilize expert input, or may leverage previously stored correlation information between segment attributes and success with a given promotion. When no information is available to assist in the generation of an input segment, the system may instead default to a slightly larger randomized subpopulation for the initial testing. Correlations identified during the initial promotion testing may be leveraged to define more granular subpopulations in subsequent promotional tests. The output segment identifier 906 is the analytical engine that groups individuals that respond well to the promotion, and identifies statistically significant attributes between this cohort versus those who didn't respond to the promotion.

As noted before, the testing of promotion variables and segment attributes may be iteratively tested in hundreds and even thousands of test promotions until sufficient information has been gathered to generate effective guidance for larger segment wide promotions. At this stage, the population profiles may be compared against a repository of promotions, and variables correlations may be leveraged to identify which profiles would perform best for the given promotion. These profiles are thereby matched to the promotion archives.

These matches may be assumed correct if the correlations are well documented, or the matches may be further tested, in some particular embodiments, in order to confirm the proper match has been made. In some embodiments more than one profile may be matched to a given promotion if it is believed that the promotion will perform well with each of the consumer segments. Likewise, a given profile may be matched to multiple promotions, if these promotions are each believed to be affective for that segment.

The segment to promotion matcher 908, after generating the matches, may assign a behavioral economic classification to the given match for future reference. When a new promotion is generated, it may be rapidly compared to the repository of behavioral economic classifications in order to identify which profile(s) would be most receptive to the newly generated promotion. The classification of the promo and profile pair relies on a multinomial classification that algorithmically assigns a behavioral economic principle. A trained, curated set of principles and their assigned promotion-profile pair are used to train and generate the model following a supervised learning approach such as SVM, multinomial regression or an ensemble approach. Over time, the model is re-trained improving the accuracy of the classification of newly paired promotions to profiles. The behavioral economic classifier (BEC) can be described by a linear combination of features:

$$y = BEC = Z\mu + J\alpha + \varepsilon$$

There a number of behavioral economic principles or classifications which are already assigned to our promotion-profile pair within the trained data set and future promotion-profiles will also be scored and assigned to a behavioral economic principle. The degree of participation to one classification or another is determined algorithmically and is dependent on the features of the promotion (Z) and profile (J).

Figure 10:
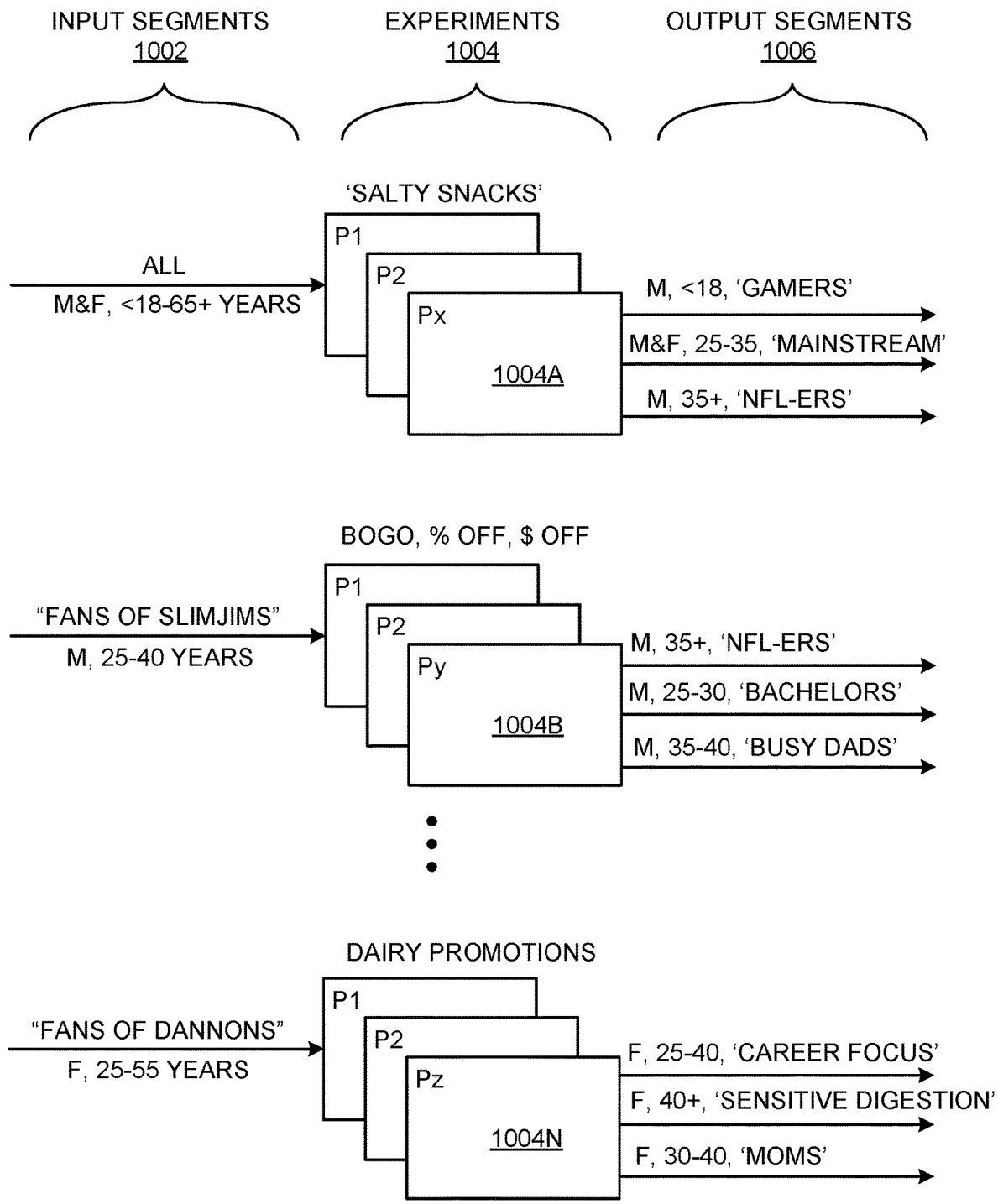
FIG. 10 shows, in accordance with an embodiment of the invention, an example how various experimental offers are delivered to different consumer visitors in order to refine the consumer profiles.

Moving on, FIG. 10 provides an example illustration of how the system auto-generates population profile segments during the testing of promotions. The system begins with input segments 1002 that are fed into the plurality of experimental promotions 1004 that are performed in the manner described extensively above. A number of correlations between the population attributes are then identified, and these populations may be further segmented automatically into a plurality of output segments 1006.

In this given example, the first promotional experiment is performed on salty snacks. Each test promotion 1004a alters one or more promotion variable and/or segment attribute in order to identify differences in performance of the various promotion structures compared to different subpopulations. In this first example, the input segment 1002 is broad, including both genders of all ages (essentially a random population). The testing in this example results in a number of subpopulation profiles being identified. Here it shows that young males (less than 18 years of age) are a profile that performs well with this set of promotions for salty snacks. They are labeled "gamers" likely because another attribute (not illustrated) common to this segment is an interest in video games. Another segment identified is gender agnostic between the ages of 25-35. These individuals are labeled "mainstream" consumers. A third segment identified are males over the age of 35 who express interest in football. Fittingly this profile is labeled "NFLers". Although three profiles are seen generated here, it is very possible that more or fewer profiles may be generated for any given set of promotion experiments.

Further down, a second set of experiments is shown for a buy-one-get-one at a discount. The product being promoted here is a popular snack known as "Slim Jims". From previous testing it has been found that a segment of males, ages 25-40, already exists that is known to be a target demographic for these products, labeled "fans of SlimJims". This input segment is subjected to a series of promotional tests where the discount format (e.g., percentage off versus dollar off, versus quantity free), discount depth, and phrasing are all altered (promotional variables as discussed previously). From this testing the system is able to identify correlations between the attributes of the input segment and the various promotional variables to identify more granular output segments. Again we see the NFLer segment of males 35 years and older with an interest in football. We also identify a young single male 25-30 profile ("Bachelors") and males 35-40 years old with young children ("Busy Dads") who respond particularly well to at least some of the test promotions.

Any number of these promotional experiments may be conducted in order to generate an exhaustive list of output segments. The final experiment shown in this example figure is for dairy products made by a manufacturer Dannon. These include cheeses, dips, frozen treats, and yogurts. Again, we have an existing segment known as "fans of Dannon" who are female ages 25-55 years old based upon purchasing history. These individuals are subjected to a series of experimental promotions $1004n$ using different Dannon products and promotional structures to identify correlation. Again, we have a series of output segments that are identified. These include women between 25-40 who are identified as being employed labeled as "Career Focused". Another sizable segment that responds well are women over 40 who have interest in products that are advertised as easing digestion. This profile is aptly labeled "Sensitive Digestion". The final profile illustrated in this example are women aged 30-40 who are known to have children, and are labeled as "Moms".

In this manner a large number of consumer profiles may be generated based upon correlations in the consumers' attributes and the association these profiles have in response to particular promotional variables. These associations and correlations may be tested for statistical significance using known statistical methodologies. This results in an extremely rich, empirically derived, dataset.

Figure 11:
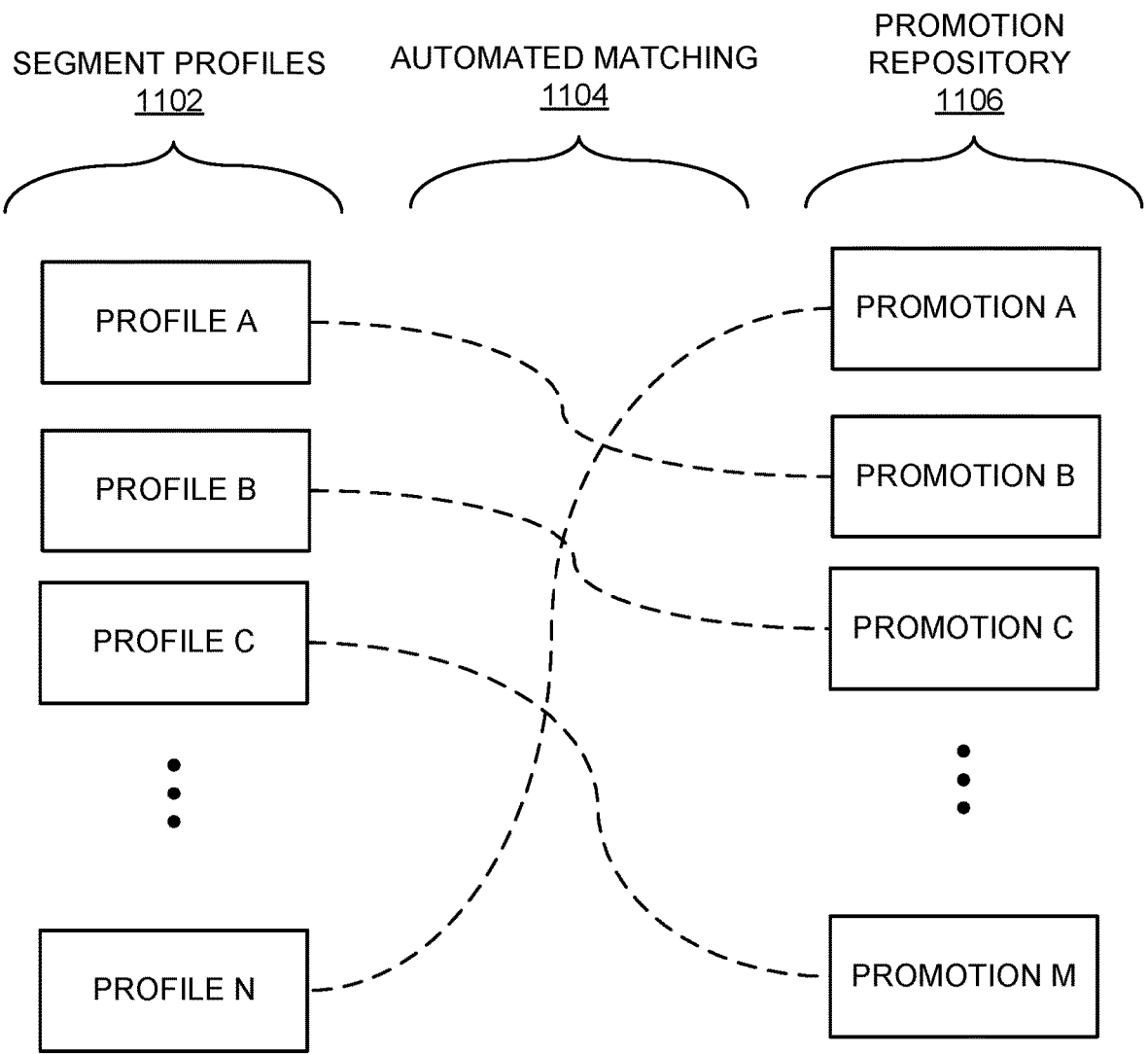
FIG. 11 shows, in accordance with an embodiment of the invention, an example of the profiles being matched to promotions stored in a promotional repository.

This information may be leveraged, subsequently as seen in FIG. 11, to match the multitude of identified profiles 1102 to repositories of promotions 1106 both already deployed or that may be utilized in the future. This process of automated matching 1104 identifies variable similarities between the stored promotions, and the variables of the promotions used to identify the segment profiles. Those promotions that have similar variable values as a previously tested promotion may be assumed to perform similarly with a given profile. Thus, profiles that are expected to perform well for a given promotion may be matched accordingly. The matching process involves generating a model that scores the combine feature set from promotions (Z) and profiles (J) based on performance such as the consumer's engagement.

$$y = \text{performance score} = Z\theta + J\delta + \varepsilon$$

A promotion's feature set can consist of imagery, call to actions, discount, offer structure, product, brand, buy quantity, etc. The profile feature set can consist of retailer preference, product preferences, demographics, geographics, consumer marketing type, purchasing behavior (frequent vs. infrequent shopper), etc. Once the model is trained it can be applied to score new promotion and profiles based on their underlying feature sets. The highest scores are attained by the ideal combination of feature set values which guide what type of promotion should be constructed and what type of profile such promotion should be targeted to for executing in market.

As previously mentioned, this matching may be a one-to-one process where each profile is matched to the best promotion corresponding to it. In alternate embodiments, any given profile may be matched with zero, one or more promotions based upon expected performance of the profile to the promotion. Likewise, any given promotion may be matched to multiple profiles if it is believed each profile would respond well to the promotion.

Figure 12:
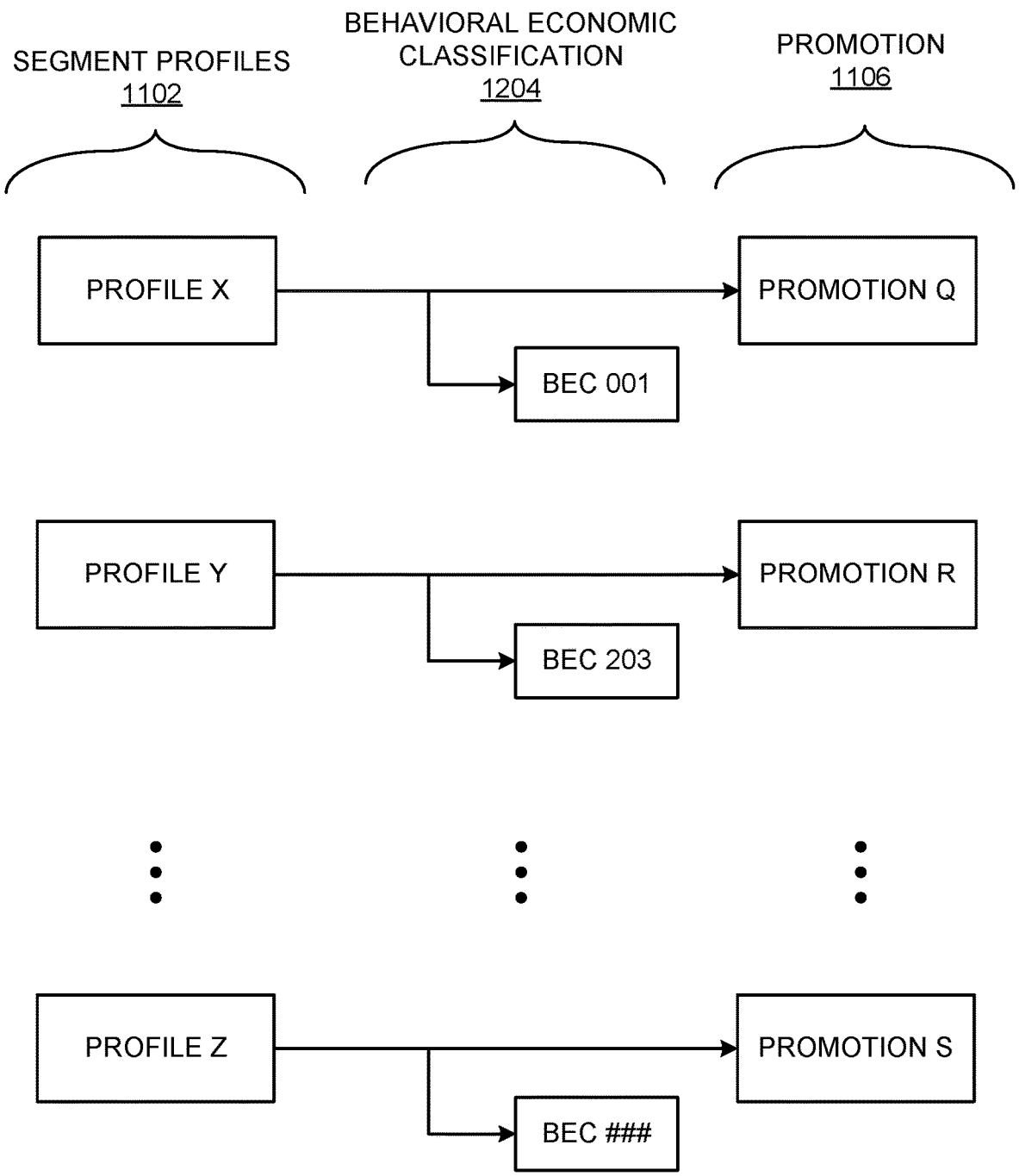
FIG. 12 shows, in accordance with an embodiment of the invention, illustrates how the profile to promotion matches are assigned a behavioral economic code for future reference.

At FIG. 12, once the segment profile 1102 is properly matched to a given (or multiple) promotion 1106 a behavioral economic classification may be assigned to the pairing. Behavioral economic classification classifies intent behind each profile-to-promotion match, which provides better understanding of consumer's intent. This allows managers of trade spend to efficiently target consumers with the optimal promotion based on the consumer's behavioral intent. Given the multitude of options that exist for promotion to profile combinations and how certain combinations are more appropriate for different marketing or spend programs, the ability to quickly and accurately identify the right set of promotions is important. Providing a filtering mechanism based on behavioral economic rationale facilitates the narrowing of possibilities for the correct promotional content and targeting attributes. For instance, a trade spend manager may be creating a promotional event in-store promoting one of their higher or decadent versions of ice cream. The user must identify the optimal promotional offer structure, messaging, display imagery as well as the type of consumer this promotion will appeal to. To quickly identify the ideal promotional and profile attributes, the user can search based on an overall behavioral mode the marketing program is looking to create; which in this case looks to make the consumer feel good about enjoying something as decadent as a raspberry double dipped vanilla ice cream bar. Such a behavioral mode is defined by the Hedonic classification. Another example would be a user in search of promotional strategy that is geared towards consumers on a budget looking to take advantage of the best discounts. A search on the repository filtered on the numerosity classification would return results for promotion and audience types that convey and are receptive to numerically driven messaging such as "70% off" versus "Every day price of $8.25" The large percentage savings of seventy may be more effective on those who are budget conscience versus a typical total price promotional framing.

This classification can thus be leveraged by retailers for specific future promotional activity. For example, assume a retailer of SlimJims is planning a NASCAR campaign for Daytona and require promotions that are relevant to this consumer base. Using the known segments, and the behavioral economic classifications, the system has already analyzed the segment of individuals in this geographic location, and people that have expressed interest in car racing. These profiles have been found to respond better to specific promotional types (buy one get one free for example), and the demographic profiles that respond well to SlimJim products have also been identified. These features may be combined to target specific promotion structures to the specific profile segments of consumers to have the most effective promotional campaign given the retailer's constraints.

In another example situation, a retailer may already have a product and promotion type that they wish to launch. The system, given these constraints may be able to query the profile to promotion behavioral economic classification database to identify the profiles that will respond most favorably to this promotional campaign. The system may then be able to deliver the promotion to a more receptive consumer base.

Likewise, a retailer may wish to reach a specific demographic. The system can identify all profiles that meet this demographic criteria, and can then formulate promotions (both content and structure) that reaches this set of profiles most effectively.

Figure 13:
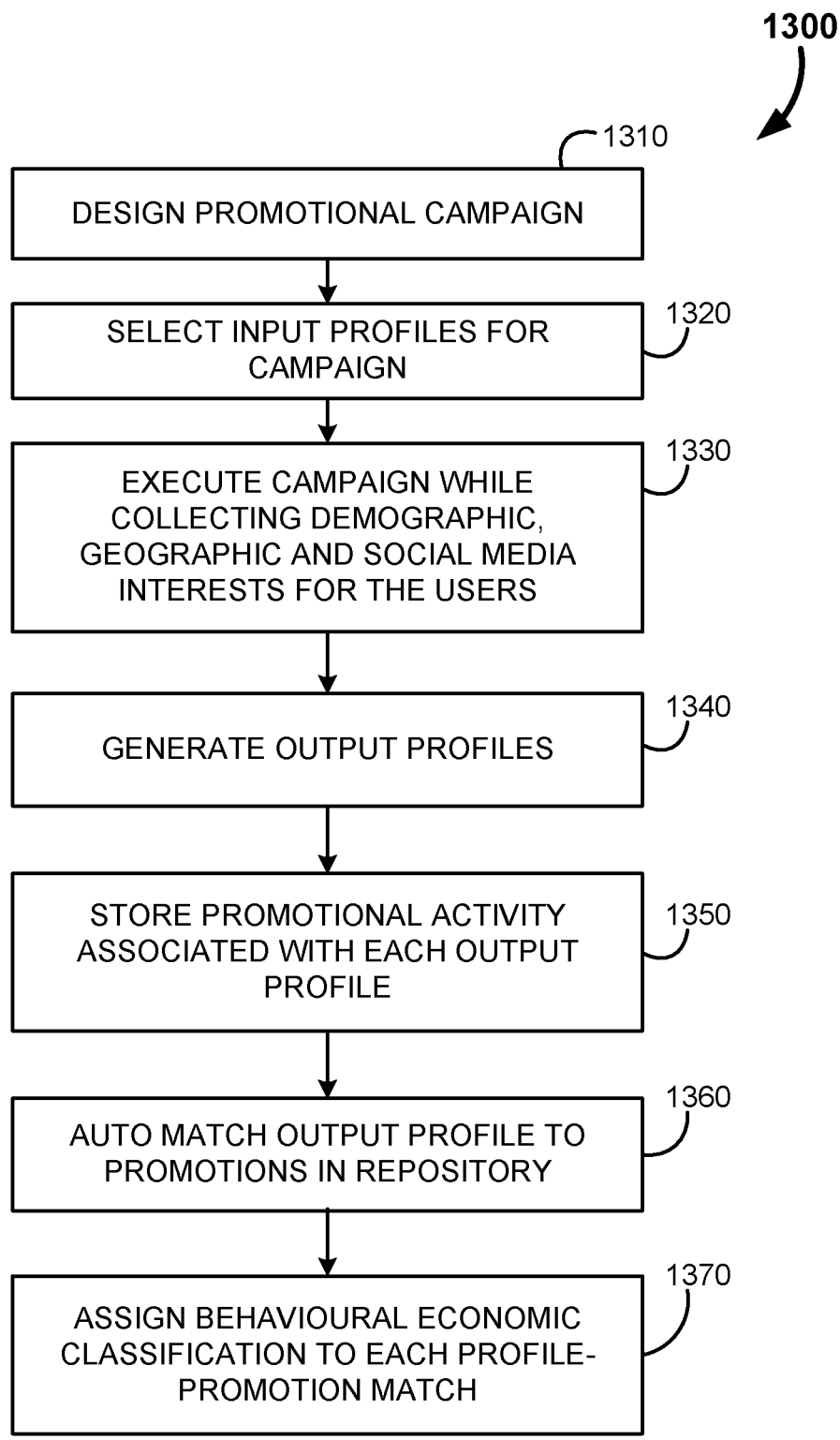
FIGS. 13 and 14 show, in accordance with an embodiment of the invention, example processes for the automated profile and promotion matching.

FIG. 13 provides a flowchart describing one example process 1300 for profile generation and automatic matching to promotions. In this example process the first step is for the design of the promotional test campaign (at 1310). One major advantage of the present system is that the promotional testing is already being performed for the purpose of optimizing a given promotion, thus the generation of profiles and testing of profile effectiveness injects little additional effort or overhead into the testing process.

Figure 14:
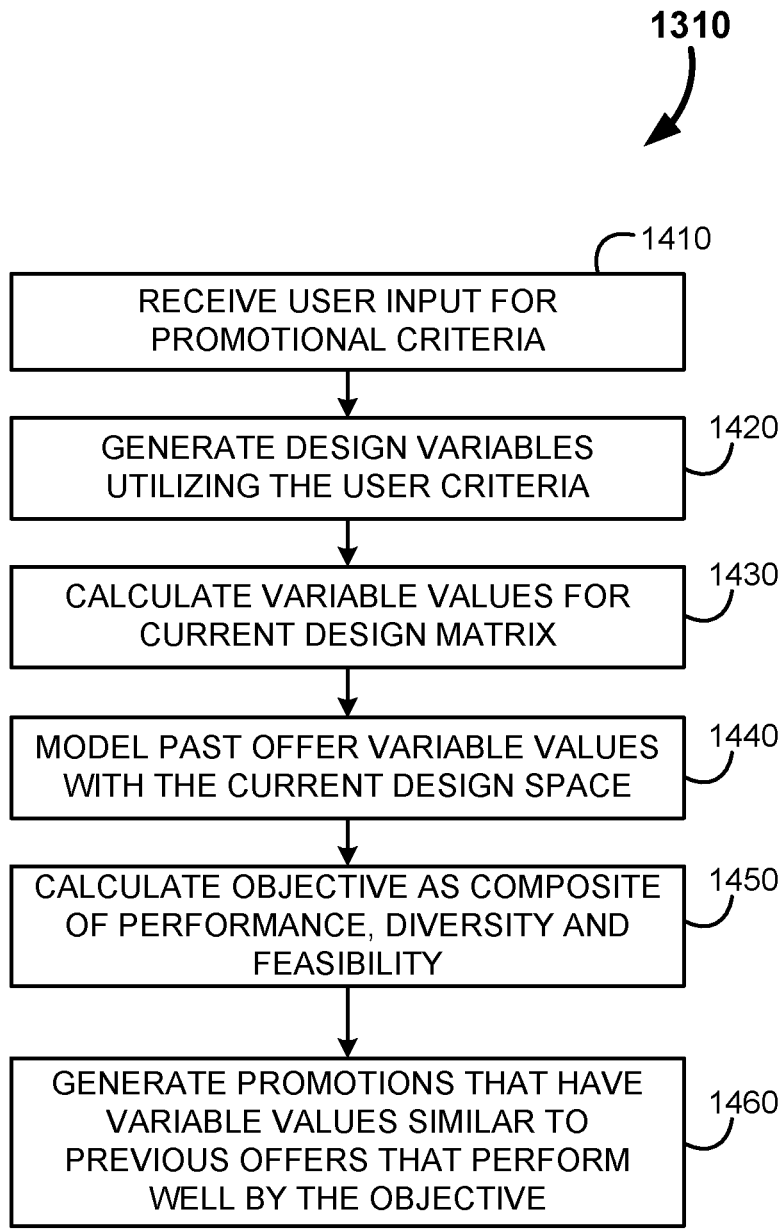

FIG. 14 provides a high level flow diagram for the steps of the design of the promotional test campaign (at 1310). As previously touched upon, the user initially provides input for the generation of the promotional campaign. Unlike other promotion generators already existing, however, the current system requires a relatively minor amount of input in order to generate a very large variety of possible promotions that vary not only in their content across two dimensions (discount and quantity), but also in the structure of the offers.

The user is required to designate a product for which the promotion is to include, and baseline guidance regarding discount depth, quantity of the items and offer structures to consider (step 1410). The system utilizes these inputs to generate a promotional design where variables values cover the design space (at 1420).

In some embodiments, the user may be able to omit even some of these other variables, and the system can auto-populate the missing values based upon past offer frequency or performance. For example, say the user knows that he wishes to generate promotions on a cosmetic by brand X, and that the promotion depth should be around 25%. However, this user is unconcerned by quantity or offer structure. The system, in these embodiments, may query a database of prior offers and determine a buy 3 get one free offer has been frequently employed. The system also determines that an offer of buy one get one 50% off is also redeemed at a very high rate. Likewise, previous offers of reduced prices have been met with varies success.

In such embodiments, the system may determine the baseline quantity is 3 units, and the offer structures include percent off a certain quantity, buy one get one a percent off, and a price per unit.

Promotional design space has been formed, the system begins the recommendation process by calculating the variable values table for the current promotional structure (step 1430). In the background, the system is also modeling past offers that have been tested in order to generate success scores for these prior offers. The previous offers are scores according to three factors that are weighted based upon the user's definition of a successful offer. These components of the score include the performance of the offer (i.e., redemption rate, download count, number of shares, etc.), the diversity of the offer (i.e., how varied the offer is compared to other tested offers), and offer feasibility (i.e., the frequency of the offer and/or the actual ability for a retailer to administer and honor the offer) (step 1450).

Once the past offers have been thus scored, the degree of similarity between the variable values of the current offers and the past tested offers may be compared. This may include generating a series of test promotions where the past offers are compared against the variable values of the present offer set in tabular form. If there is a similarity, the table may be populated by a 1, whereas if the past offer did not include the variable value a 0 is input. This provides a mechanism to compare the current offers to the prior tested offers, and this degree of similarity may be used to impute the tested offers' scores to the untested offers as a prediction of success. A general model is shown below to illustrate the dependency of the overall objective function on its sub-objectives which are all dependent on the inputs codified as offer variables (X), contextual variables or covariates (K) and error ($\varepsilon$). Such model is constructed on historically tested offers and future scoring or predictions for un-tested offers can be realized leveraging the modeled parameters, $\beta$ and $\phi$.

$$y=f(y_{perf},y_{div},y_{feas})=X\beta+k\phi+\varepsilon$$

Once the scores for the offers in the test promotions have been modeled, the system may select the offers, or individual offer structures, that are the most likely to be successful (at 1460). This may be performed by comparing the score to a minimum threshold, and flagging all scores above the threshold and/or selecting the top X scored offers and flag them.

Returning to FIG. 13, after the test promotions have been thus defined, one or more input profiles are selected (at 1320) for testing in the experimental campaign. This selection is data driven: if a subpopulation is already known to respond well to the promotion based upon previous testing, or if a segment is known to purchase a product due to past purchase history, these broad segments may be selected for refinement in the experimentation. However, where data is lacking or weak, a broader (or even random) subpopulation may be selected for the input segment. Obviously, a more targeted input population allows for less testing in order to generate more granular output segments. Alternatively, for the same degree of testing, the resulting output profiles will be more granular or more accurate if a more targeted input segment is utilized. However, there is always a risk of missing a high performing segment if the initial segment being utilized is too narrow.

Next, the campaign is executed (at 1330) where each promotion test varies a promotional variable and/or a subpopulation attribute. The results include listings of the promotion variable value and subpopulation attributes, as well as the response rate of the individuals. From this information, output segments may be generated in two distinct ways. First, for a given promotion the users who responded positively can be compared against those who responded negatively. Similarities between the positive cohort can be compared against the negative cohort, and analysis can be performed to see if there is a statistically significant difference in the segment attribute. For example, assume males ages 20-40 are tested for a promotion for chips and salsa. One attribute tracked for this population is social interactions. Based upon social media information, some of these tested individuals are shown to engage in social activities two or more times a week. It is found that, generally, the consumers that respond well to the tested promotion have this attribute at a statistically meaningful amount more than users who negatively respond to the promotion. This profile of people are labeled as "Partiers". In a subsequent test, it is then found that this group responds better to a buy-one-get-one style promotion as compared to a discount of equal depth. Thus a new profile may be generated, and associations between the profile and promotion variables may be appropriately captured.

The identified profiles that are elucidated through the testing are then used to generate the output profiles from the testing (at 1340). The process may then store the information, including associations between profiles and promotion variable values (at 1350). These metrics may then be user to match the available profiles to all available promotions in a promotion repository, based upon similarities of variable values between the stored promotions, and those that have actually been tested (at 1360).

Lastly, the matched promotions to profiles are each assigned a behavioral economic classification (at 1370) which provides information regarding the consumers' intent. This classification may be leveraged when a new promotion is being proposed in order to more rapidly determine which profile(s) would be best to utilize for a new proposed campaign.

III. System Embodiments

Figure 15A:
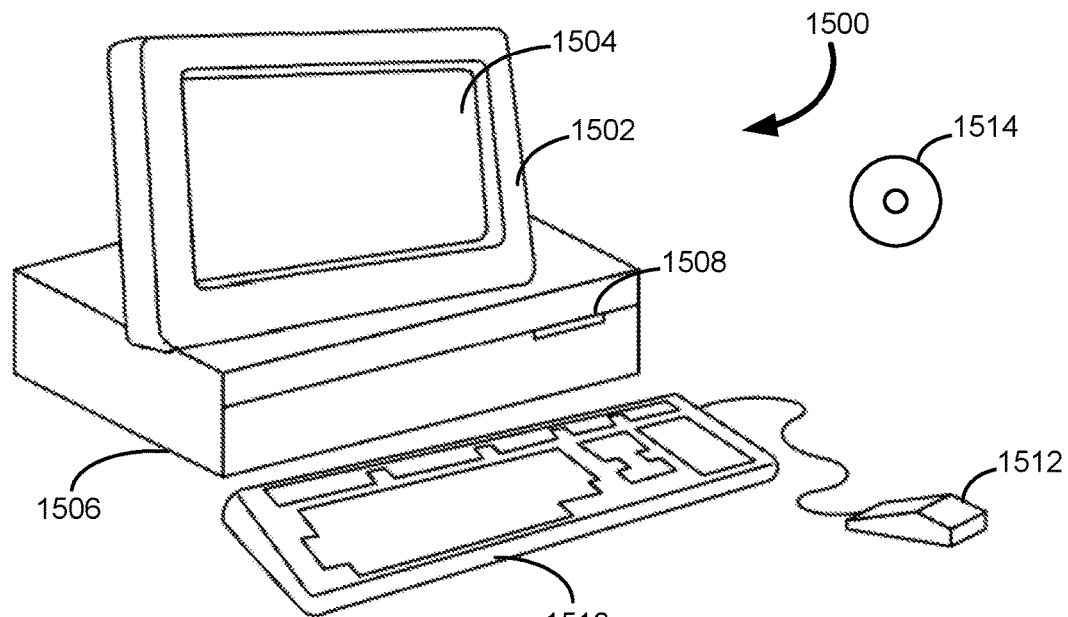
FIGS. 15A and 15B are example computer systems capable of implementing the system for automated promotion to profile matching.
Figure 15B:
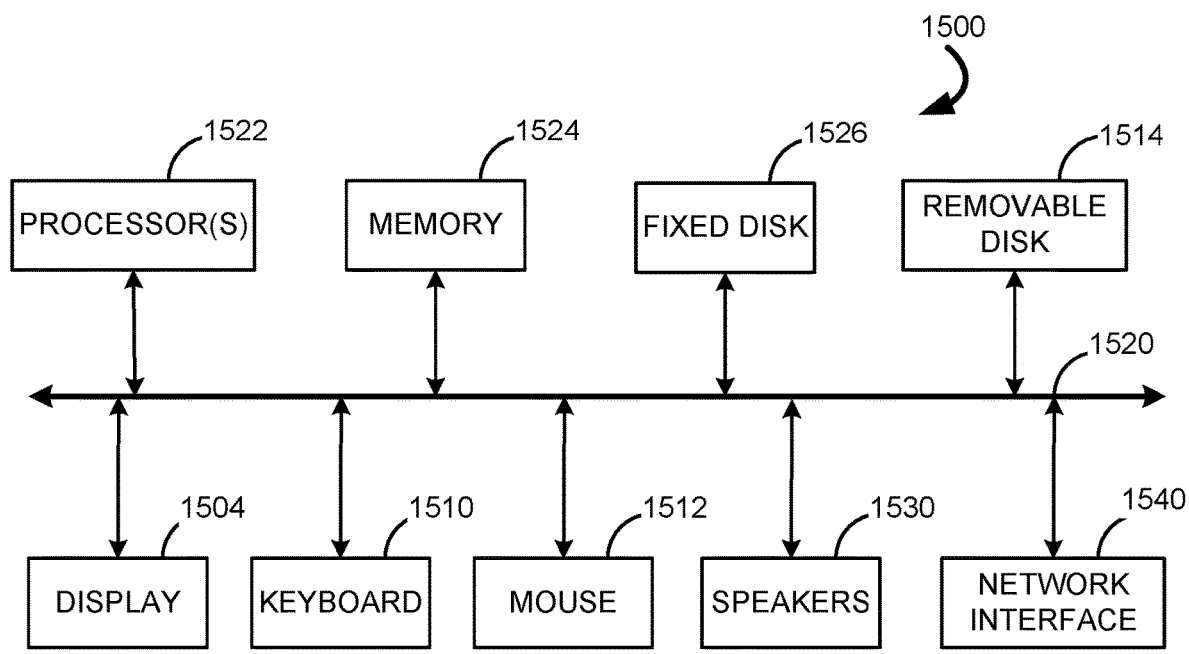

Now that the systems and methods for the automated matching of promotions to consumer profiles have been described, attention shall now be focused upon systems capable of executing the above functions. To facilitate this discussion, FIGS. 15A and 15B illustrate a Computer System 1500, which is suitable for implementing embodiments of the present invention. FIG. 15A shows one possible physical form of the Computer System 1500. Of course, the Computer System 1500 may have many physical forms ranging from a printed circuit board, an integrated circuit, and a small handheld device up to a huge super computer. Computer system 1500 may include a Monitor 1502, a Display 1504, a Housing 1506, a Disk Drive 1508, a Keyboard 1510, and a Mouse 1512. Disk 1514 is a computer-readable medium used to transfer data to and from Computer System 1500.

FIG. 15B is an example of a block diagram for Computer System 1500. Attached to System Bus 1520 are a wide variety of subsystems. Processor(s) 1522 (also referred to as central processing units, or CPUs) are coupled to storage devices, including Memory 1524. Memory 1524 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 1526 may also be coupled bi-directionally to the Processor 1522; it provides additional data storage capacity and may also include any of the computer-readable media described below. Fixed Disk 1526 may be used to store programs, data, and the like and is typically a secondary storage medium (such as a hard disk) that is slower than primary storage. It will be appreciated that the information retained within Fixed Disk 1526 may, in appropriate cases, be incorporated in standard fashion as virtual memory in Memory 1524. Removable Disk 1514 may take the form of any of the computer-readable media described below.

Processor 1522 is also coupled to a variety of input/output devices, such as Display 1504, Keyboard 1510, Mouse 1512 and Speakers 1530. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1522 optionally may be coupled to another computer or telecommunications network using Network Interface 1540. With such a Network Interface 1540, it is contemplated that the Processor 1522 might receive information from the network, or might output information to the network in the course of performing the above-described automated profile to promotion matching. Furthermore, method embodiments of the present invention may execute solely upon Processor 1522 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A computer implemented method for matching consumer profiles to promotions that is performed by a promotion optimization system that includes a processor and memory, containing a promotion module, an administration module, and a monitoring module, the method comprising:
   identifying a plurality of segment variable value pairs that define a plurality of possible segments for a population of consumers;
   segmenting the population of customers into profiles by commonality of attributes;
   identifying a plurality of promotion variable value pairs of a promotional design space;
   generating a plurality of test promotions that test different permutations of the promotion variable value pairs;
   administering the plurality of test promotions against a selected profile;
   obtaining-responses to the test promotions;
   identifying correlations between specific segment variable value pairs and the profiles based upon the obtained responses;
   matching the profiles to a promotion type based upon likelihood of a positive result;
   modeling an offer prediction as a linear combination of offer variables multiplied by a first modeled parameter, plus covariates multiplied by a second modeled parameter, plus an error value; and
   setting a minimum threshold for the offer prediction.

2. The method of claim 1, further comprising classifying associations between the defined segments and the matched promotion type.

3. The method of claim 2, wherein the classifying includes assigning a behavioral economic classification to the match.

4. The method of claim 3, further comprising outputting the behavioral economic classification to a marketer.

5. The method of claim 3, wherein the behavioral economic classification provides insights into consumer motivations.

6. The method of claim 3, wherein the behavioral economic classification is generated using a trained and curated set of behavioral economic principles assigned to a promotion to segment match to generate and train an association model.

7. The method of claim 1, wherein promotion types used for matching to the profiles are collected from a repository of past promotions.

8. The method of claim 7, wherein the matching includes generating a performance score model (y) that scores a combine feature set from promotions (Z) and profiles (J) based on performance.

9. The method of claim 8, wherein the profile performance is based on consumer engagement.

10. A system for matching consumer profiles to promotions comprising:
    a plurality of analytics servers that include processors and memory for:
       identifying a plurality of segment variable value pairs that define a plurality of possible segments for a population of consumers;
       segmenting the population of customers into profiles by commonality of attributes;
       identifying a plurality of promotion variable value pairs of a promotional design space, generating a plurality of test promotions that test different permutations of the promotion variable value pairs;
    at least one administration server that includes a processor and memory for administering the plurality of test promotions against a selected profile, and obtaining responses to the test promotions, wherein the at least one administration server includes databases, and processors for electronically delivering the plurality of test promotions;

a segment matcher server that includes a processor and memory for identifying correlations between specific segment variable value pairs and the profiles based upon the obtained responses, and matching the profiles to a promotion type based upon likelihood of a positive result; and an offer selection server that includes a processor and memory for modeling an offer prediction as a linear combination of offer variables multiplied by a first modeled parameter, plus covariates multiplied by a second modeled parameter, plus an error value, and setting a minimum threshold for the offer prediction.

11. The system of claim 10, wherein the segment matcher further classifies associations between the defined segments and the matched promotion type.

12. The system of claim 11, wherein the classifying includes assigning a behavioral economic classification to the match.

13. The system of claim 12, wherein the segment matcher further outputs the behavioral economic classification to a marketer.

14. The system of claim 12, wherein the behavioral economic classification provides insights into consumer motivations.

15. The system of claim 12, wherein the behavioral economic classification is generated using a trained and curated set of behavioral economic principles assigned to a promotion to segment match to generate and train an association model.

16. The system of claim 10, wherein promotion types used for matching to the profiles are collected from a repository of past promotions.

17. The system of claim 16, wherein the matching includes generating a performance score model (y) that scores a combine feature set from promotions (Z) and profiles (J) based on performance.

18. The system of claim 17, wherein the profile performance is based on consumer engagement.

* * * * *